United States Patent
Wegerif et al.

(10) Patent No.: US 12,482,294 B2
(45) Date of Patent: Nov. 25, 2025

(54) METHOD, COMPUTER SOFTWARE, NON-TRANSITORY STORAGE MEDIUM, APPARATUS AND SYSTEM FOR PERFORMING A MEASUREMENT OF A PHYSIOLOGICAL PARAMETER OF A PERSON FROM A SERIES OF IMAGES

(71) Applicant: Xim Limited, Chilworth (GB)

(72) Inventors: Simon Christopher Wegerif, Southampton (GB); Adam Kiddle, Christchurch (GB)

(73) Assignee: Xim Limited, Chilworth (GB)

( * ) Notice: Subject to any disclaimer, the term of this patent is extended or adjusted under 35 U.S.C. 154(b) by 511 days.

(21) Appl. No.: 18/052,728

(22) Filed: Nov. 4, 2022

(65) Prior Publication Data
US 2024/0153304 A1    May 9, 2024

(51) Int. Cl.
G06K 9/00    (2022.01)
G06T 5/10    (2006.01)
(Continued)

(52) U.S. Cl.
CPC .............. *G06V 40/165* (2022.01); *G06T 5/10* (2013.01); *G06T 7/11* (2017.01); *G06T 7/90* (2017.01);
(Continued)

(58) Field of Classification Search
CPC .............. G06F 16/5838; G06F 18/2411; G06F 18/2415; G06F 3/167; G06F 2203/011;
(Continued)

(56) References Cited

U.S. PATENT DOCUMENTS

2015/0358549 A1*  12/2015  Cho .............. G06V 20/63
                                                        348/333.11
2019/0082972 A1*  3/2019  Tao .............. A61B 5/1102
(Continued)

FOREIGN PATENT DOCUMENTS

WO    2013027027 A2    2/2013
WO    2016184703 A1    11/2016

OTHER PUBLICATIONS

Wiffen, et al.; Measurement of Vital Signs by Lifelight Software in Comparison to Standard of Care Multisite Development (Vision-MD): Protocol for an Observational Study; JMIR Research Protocols; vol. 12, pp. 1-8; Jan. 11, 2023.

*Primary Examiner* — Alex Kok S Liew
(74) *Attorney, Agent, or Firm* — Meunier Carlin & Curfman LLC

(57) ABSTRACT

A method of performing a measurement of a physiological parameter of a person from a series of images is provided, the method comprising: acquiring a series of images of a person, each image of the series of images including at least a skin exposed region of the person; partitioning at least a portion of each image of the series of images into a plurality of image regions; computing target colour values for each image region of each image of the series of images; determining a signal quality indicator of each of the plurality of image regions for the series of images from the target colour values; classifying the plurality of image regions in accordance with the signal quality indicator which has been determined; and performing a measurement of a physiological parameter of the person using one or more of the plurality of image regions based on a result of the classification.

23 Claims, 20 Drawing Sheets

(51) Int. Cl.
  *G06T 7/11*     (2017.01)
  *G06T 7/90*     (2017.01)
  *G06V 10/74*    (2022.01)
  *G06V 10/764*   (2022.01)
  *G06V 40/16*    (2022.01)

(52) U.S. Cl.
  CPC .......... *G06V 10/761* (2022.01); *G06V 10/764* (2022.01); *G06T 2207/20056* (2013.01); *G06T 2207/30201* (2013.01)

(58) Field of Classification Search
  CPC .......... G06F 3/011; G06F 3/012; G06F 3/013; G06F 3/017; G06F 1/163; G06F 1/1684; G06F 1/1686; G06F 16/9038; G06F 18/253; G06F 2218/10; G06F 3/014; G06F 3/015; G06F 3/016; G06F 3/0304; G06F 3/0482; G06F 3/04847; G06F 3/005; G06N 20/00; G06N 3/045; G06N 3/08; G06N 3/048; G06N 20/10; G06N 3/047; G06N 3/04
  See application file for complete search history.

(56) References Cited

U.S. PATENT DOCUMENTS

2019/0239761 A1* 8/2019 Tao .......................... G06T 5/40
2022/0061683 A1* 3/2022 Adachi ................ A61B 5/7485

* cited by examiner

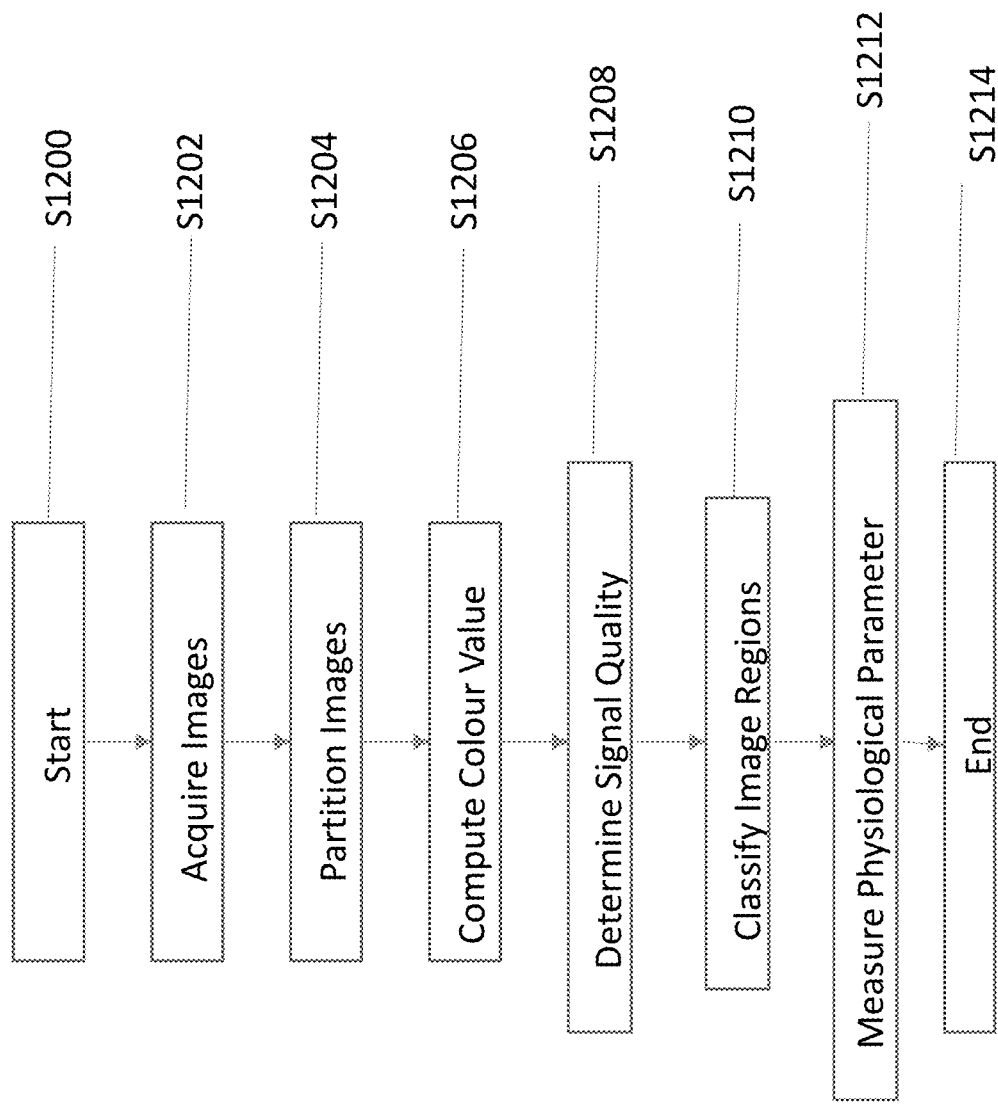

METHOD, COMPUTER SOFTWARE, NON-TRANSITORY STORAGE MEDIUM, APPARATUS AND SYSTEM FOR PERFORMING A MEASUREMENT OF A PHYSIOLOGICAL PARAMETER OF A PERSON FROM A SERIES OF IMAGES

BACKGROUND

Field of the Disclosure

The present disclosure provides a method, computer software, non-transitory storage medium, apparatus and system for performing a measurement of a physiological parameter of a person from a series of images.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Over recent years, people have investigated methods of predicting an individual's health. Many of these techniques require the individual to be monitored for a period of time wearing a testing device. This can be disadvantageous as a person has to remember they should be tested and must wear the device while being tested.

Work has been carried out to partly automate this process. Recently, techniques for performing remote photoplethysmography (PPG or rPPG) have been developed. In WO 2013/027027, a method of automatically monitoring an individual via a webcam is described. In this document, a person under test sits in front of the webcam and their pulse is identified from the slight variation in skin colour which occurs when the heart beats.

However, it can be difficult to measure a physiological parameter of a person from an image in certain situations. For example, it can be difficult to measure a physiological parameter of a person when additional objects or people are located in the image. Also, it can be difficult to measure a physiological parameter of a person if the person who is having their physiological parameter measured changes position and/or there are changes in environmental factors during the image capture. In these situations, a noisy output may be obtained which can lead to erroneous measurement of the physiological parameter.

WO 2016/184703 A1 provides an apparatus and method for identifying living skin tissue in a video sequence. In WO 2016/1847031, an invisible physiological feature (e.g. a pulse) is used to differentiate between humans and non-humans in a video sequence. Specifically, the video sequence is first segmented into dense local regions where a pulse can be independently measured. Pulse signals extracted from skin regions belonging to the same subject share similarities in many aspects such as phase and frequency, whereas the ones extracted from non-skin regions (e.g. background) are random noises without correlation. Areas of living skin tissue in the video sequence can therefore be identified.

Thus, WO 2016/184703 A1 addresses problems related to the identification of living skin tissue in a video sequence. However, while WO 2016/184703 A1 uses an invisible physiological feature (e.g. a pulse) of a person to improve detection of living tissue in an image, it does not address fundamental issues relating to improving the measurement of the physiological parameter itself.

It is an aim of the present disclosure to address these issues.

SUMMARY

In a first aspect of the present disclosure, method of performing a measurement of a physiological parameter of a person from a series of images is provided, the method comprising: acquiring a series of images of a person, each image of the series of images including at least a skin exposed region of the person; partitioning at least a portion of each image of the series of images into a plurality of image regions; computing target colour values for each image region of each image of the series of images; determining a signal quality indicator of each of the plurality of image regions for the series of images from the target colour values; classifying the plurality of image regions in accordance with the signal quality indicator which has been determined; and performing a measurement of a physiological parameter of the person using one or more of the plurality of image regions based on a result of the classification.

In a second aspect of the present disclosure, computer software which, when executed by a computer, causes the computer to perform a method according to embodiments of the disclosure is provided.

In a third aspect of the disclosure, a non-transitory machine-readable storage medium which stores computer software according to embodiments of the disclosure is provided.

In a fourth aspect of the disclosure, an apparatus for performing a measurement of a physiological parameter of a person from a series of images is provided, the apparatus comprising circuitry configured to: acquire a series of images of a person, each image of the series of images including at least a skin exposed region of the person; partition at least a portion of each image of the series of images into a plurality of image regions; compute target colour values for each image region of each image of the series of images; determine a signal quality indicator of each of the plurality of image regions for the series of images from the target colour values; classify the plurality of image regions in accordance with the signal quality indicator which has been determined; and perform a measurement of a physiological parameter of the person using one or more of the plurality of image regions based on a result of the classification.

In a fifth aspect of the disclosure, a system comprising a portable electronic device and an apparatus according to the present disclosure is provided, the portable electronic device comprising: an image capture device configured to capture a series of images of a person, each image of the series of images including at least a skin exposed region of the person; and communication circuitry configured to: transmit the series of images of the person to the apparatus of the present disclosure; and receive a measurement of a physiological parameter of the person from the apparatus of the present disclosure.

In accordance with embodiments of the disclosure, a signal quality of remote photoplethysmography (PPG or rPPG) can be enhanced, which leads to improvements in the accuracy and reliability of measurement of a physiological parameter of a person. Moreover, according to embodiments of the disclosure disturbances the impact during the measurement of the physiological parameter of a person (such as movement, light fluctuations, ballistocardiographic signals or the like) can be minimised.

Of course, it will be appreciated that the present disclosure is not particularly limited to these advantageous technical effects. Other advantageous technical effects will become apparent to the skilled person when reading the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 12 illustrates an example method in accordance with embodiments of the disclosure.

DESCRIPTION OF THE EMBODIMENTS

Figure 1:
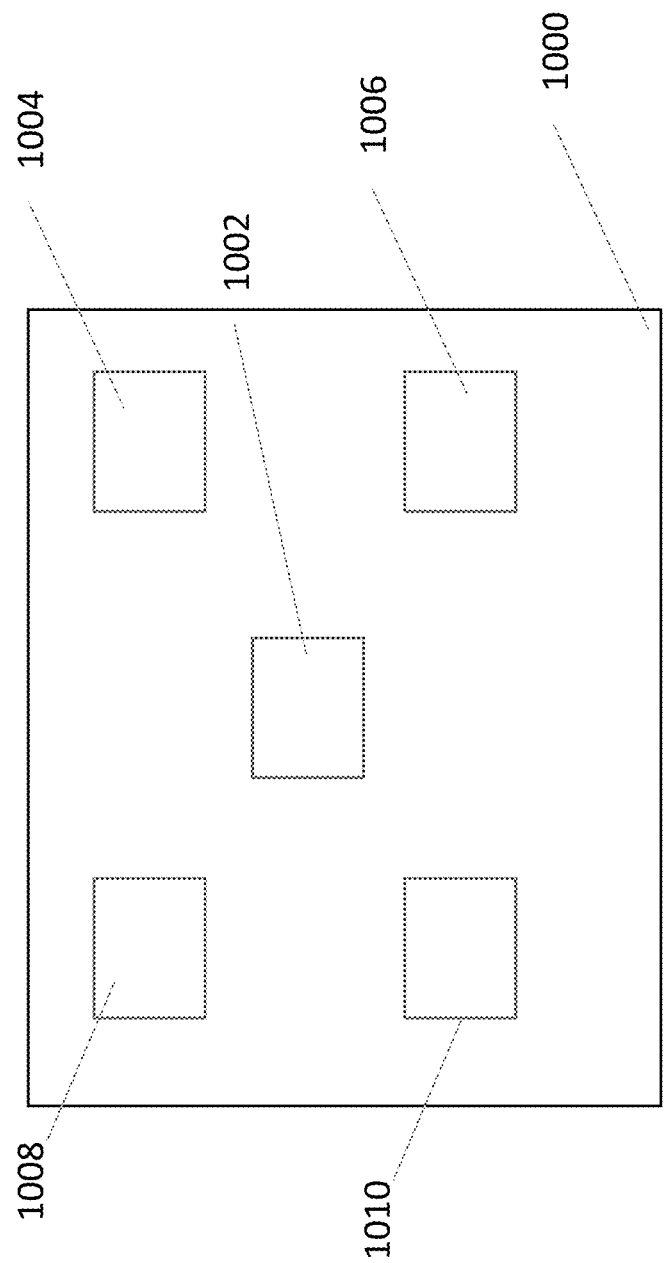
FIG. 1 illustrates an apparatus in accordance with embodiments of the disclosure.

Referring now to the drawings, wherein like reference numerals designate identical or corresponding parts throughout the several views.

Referring to FIG. 1, an apparatus 1000 according to embodiments of the disclosure is shown. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002. In some examples, the apparatus 1000 may be a portable computing device such as a mobile phone, laptop computer or tablet computing device.

The processing circuitry 1002 may be a microprocessor carrying out computer instructions or may be an Application Specific Integrated Circuit. The computer instructions are stored on storage medium 1004 which maybe a magnetically readable medium, optically readable medium or solid state type circuitry. The storage medium 1004 may be integrated into the apparatus 1000 or may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Additionally, an optional user input device 1006 is shown connected to the processing circuitry 1002. The user input device 1006 may be a touch screen or may be a mouse or stylist type input device. The user input device 1006 may also be a keyboard or any combination of these devices.

A network connection 1008 may optionally be coupled to the processor circuitry 1002. The network connection 1008 may be a connection to a Local Area Network or a Wide Area Network such as the Internet or a Virtual Private Network or the like. The network connection 1008 may be connected to a server allowing the processor circuitry 1002 to communicate with another apparatus in order to obtain or provide relevant data. The network connection 1002 may be behind a firewall or some other form of network security.

Additionally, shown coupled to the processing circuitry 1002, is a display device 1010. The display device 1010, although shown integrated into the apparatus 1000, may additionally be separate to the apparatus 1000 and may be a monitor or some kind of device allowing the user to visualise the operation of the system. In addition, the display device 1010 may be a printer, projector or some other device allowing relevant information generated by the apparatus 1000 to be viewed by the user or by a third party.

Figure 2:
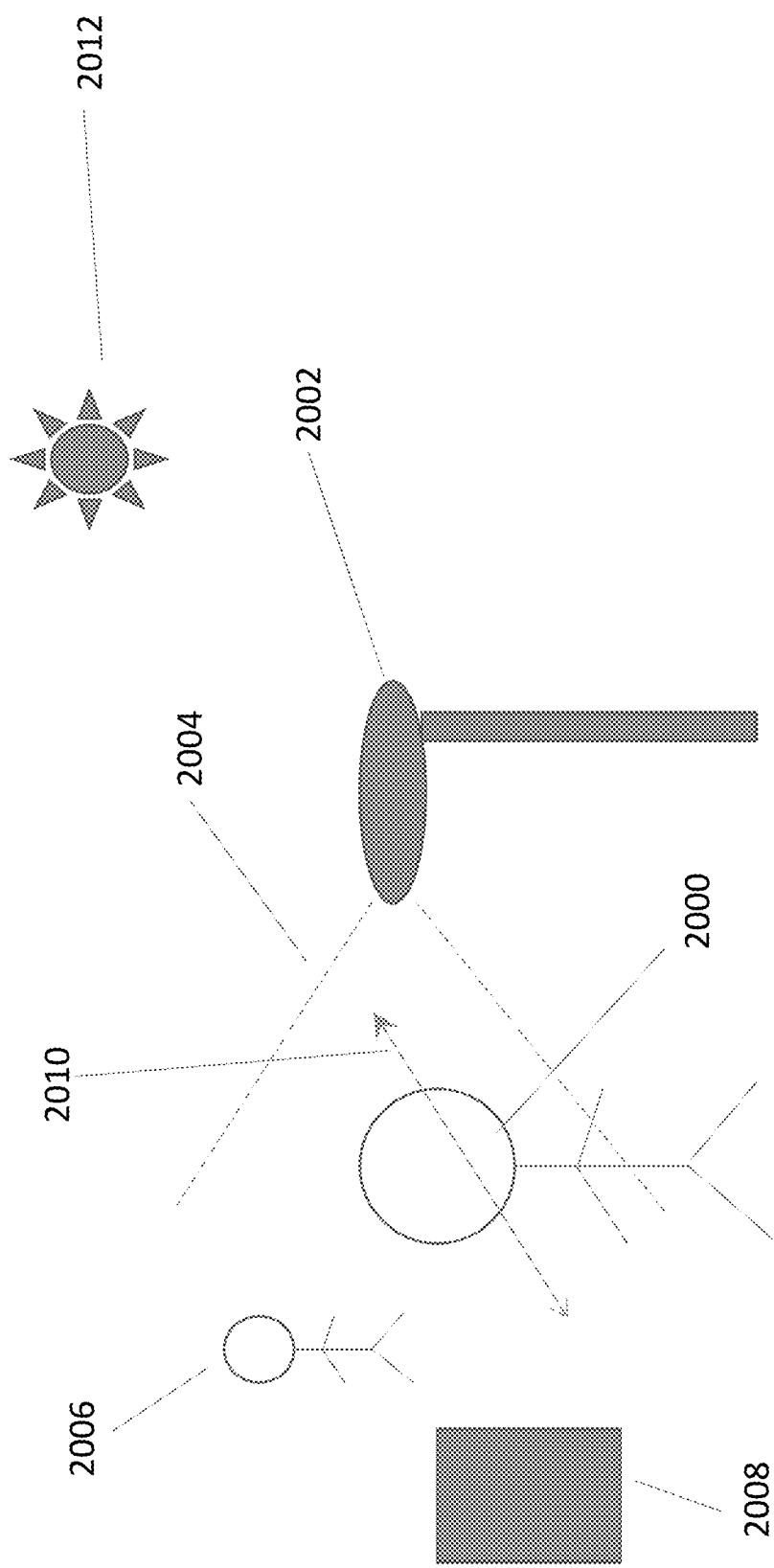
FIG. 2 illustrates an example situation to which embodiments of the disclosure may be applied.

Turning now to FIG. 2, an example situation to which embodiments of the disclosure are applied is disclosed. In this example situation, a person is undergoing a measurement of a physiological characteristic using remote photoplethysmography.

More specifically, in this example situation, a person 2000 is shown. This person 2000 is located in front of an image capture device 2002. In this example, image capture device 2002 is a webcam.

Image capture device 2002 (the webcam) is capturing an image of the person 2000. The field of view of the image capture device 2002 is illustrated as the region 2004 in FIG. 2. Accordingly, person 2000 is located within the field of view of the image capture device 2004. As explained, the image capture device 2002 is capturing an image of the person 2000 for the purpose of measuring a physiological parameter of the person 2000 using remote photoplethysmography (PPG or rPPG). The images which are captured by the image capture device 2002 may be transmitted to a processing device (not shown) in order that the physiological parameter can be determined from the image.

Measurement of a physiological parameter requires that a clear signal can be obtained from the images. Therefore, it can be difficult to measure a physiological parameter of a person from an image in certain situations (such as when there is a lot of noise in the image).

For example, as shown in the example situation of FIG. 2 of the present disclosure, one or more additional objects may be located within the field of view of the image capture device 2002 when it is capturing an image of the person 2000. Indeed, in this example, a second person 2006 and an inanimate object 2008 are located in the field of view of the image capture device 2002 when it is capturing an image of the person 2000.

The presence of the second person 2006 in the field of view of the image capture device 2002 when it is capturing an image of the person 2000 can make it more difficult to measure a physiological parameter of person 2000 from an image captured by image capture device 2002. This is because the second person 2006 may move around in the background of the image causing changes which make detection of the physiological parameter of person 2000 more difficult when using rPPG techniques. Furthermore, even inanimate object 2008 may make measurement of the physiological parameter of the person 2000 more difficult. This is because the inanimate object 2008 may have one or more visual features (e.g. a certain colour or pattern) which make measurement of a physiological parameter of the person 2000 using rPPG techniques more difficult.

Thus, it will be appreciated that it can be difficult to measure a physiological parameter of a person when additional objects or people are located in the image.

Furthermore, measurement of the physiological parameter of the person 2000 using rPPG techniques can be more difficult if the person 2000 changes position as the image capture device 2002 captures the images. There are a number of reasons why a person may change position during the image capture. Firstly, the person who is having their physiological parameter measured may be feeling unwell. If they are feeling unwell, it may be more difficult for the person 2000 to remain in a fixed position as the image capture device 2002 captures the images. As such, they may move within the field of view of the image capture device (e.g. along the movement path 2010 shown in FIG. 2 of the present disclosure). Moreover, the person 2000 may become distracted during the image capture and may change position (e.g. in response to something which happens in their local environment). For example, if the person 2000 hears a noise made by the second person 2006, the person 2000 may change their position slightly in response to this noise. This makes it more difficult to measure a physiological parameter of a person using rPPG techniques.

Thus, it will be appreciated that it can be difficult to measure a physiological parameter of a person when the person moves during image capture.

In addition, other environmental changes can also make it more difficult to measure a physiological parameter of a person. For example, the rPPG techniques for measuring a physiological parameter of a person utilize the slight variation in skin colour which occurs when the person's heart beats. Therefore, changes in the light in the environment (e.g. from light source 2012 in the example of FIG. 2) can make it more difficult to measure the physiological parameter of the person. This may occur if there are changes in either natural or artificial sources of light during the image capture (e.g. if a second person 2006 turns on/off an artificial light source in the vicinity of the person 2000 during the image capture). Changes of light in the environment may also have a varying degree of impact on the measurement of a physiological parameter of the person depending on the skin tone of the person.

Thus, it will be appreciated that environmental changes which occur during image capture in the vicinity of the person 2000 during image capture may also make it more difficult to measure the physiological parameter of the person. In particular, measurement of the physiological parameter of the person using rPPG techniques relies on the variation in colour of the person's skin over time as their heart beats. However, colour variations in the person's skin may appear between the images obtained by the image capture device for other reasons in addition to the heart beat of the person. Therefore, it can be difficult to measure the physiological characteristic of the person from a series of images if a strong signal (being colour change related to the heart beat of the person) cannot be extracted from the images.

For at least these reasons (in addition to those reasons explained in the Background) a method, apparatus and computer program product for measurement of a physiological parameter of a person from a series of images is provided in accordance with embodiments of the disclosure.

<Apparatus>

Figure 3:
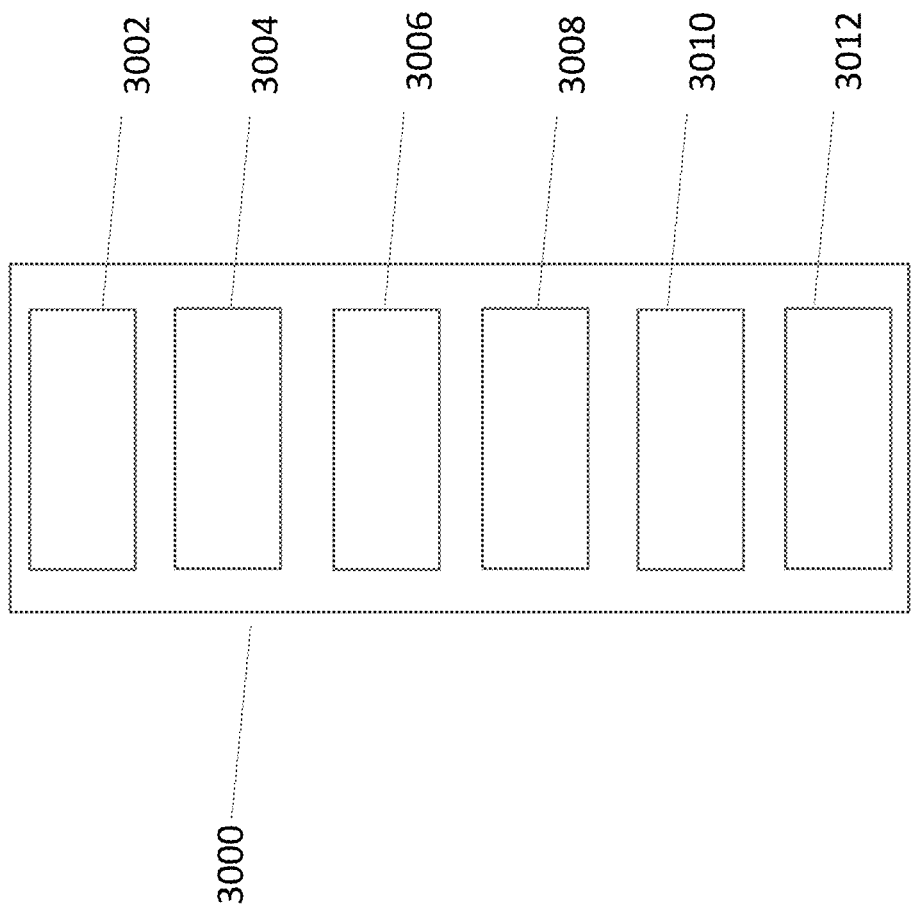
FIG. 3 illustrates an example apparatus in accordance with embodiments of the disclosure.

Turning now to FIG. 3 of the present disclosure, an example apparatus in accordance with embodiments of the disclosure is illustrated. In particular, apparatus 3000 (illustrated in FIG. 3 of the present disclosure) is an apparatus for performing a measurement of a physiological parameter of a person from a series of images.

Apparatus 3000 comprises an acquiring unit 3002, a partitioning unit 3004, a computing unit 3006, a determining unit 3008, a classifying unit 3010 and a measuring unit 3012. In examples, these units of apparatus 3000 may be implemented as circuitry.

Acquiring unit 3002 of apparatus 3000 is configured to acquire a series of images of a person, each image of the series of images including at least a skin exposed region of the person.

Partitioning unit 3004 is configured to partition at least a portion of each image of the series of images into a plurality of image regions.

Computing unit 3006 is configured to compute target colour values for each image region of each image of the series of images.

Determining unit 3008 is configured to determine a signal quality indicator of each of the plurality of image regions for the series of images from the target colour values.

Then, classifying unit 3010 is configured to classify the plurality of image regions in accordance with the signal quality indicator which has been determined; and Finally, measuring unit 3012 is configured to perform a measurement of a physiological parameter of the person using one or more of the plurality of image regions based on a result of the classification.

In this way, apparatus 3000 of the present disclosure is able to improve the accuracy and reliability of measurement of a physiological parameter of a person. This is because apparatus 3000 extracts a resultant signal (pulse of the person) from an image region or regions with the highest signal quality and uses this resultant signal in the measurement of the physiological parameter of the person. As such, the most accurate and reliable resultant signal which can be extracted from the series of images is used in the measurement of the physiological parameter of the person.

Further details regarding apparatus 3000 will be described with reference to FIGS. 4 to 6 of the present disclosure.

<Acquiring Unit 3002>

As explained with reference to FIG. 3 of the present disclosure, apparatus 3000 includes an acquiring unit 3002 which is configured to acquire a series of images of a person, each image of the series of images including at least a skin exposed region of the person.

The acquiring unit 3002 of apparatus 3000 may be communicatively coupled to an image capture device (such as image capture device 2002 described with reference to FIG. 2 of the present disclosure). The acquiring unit 3002 of apparatus 3000 may then acquire the series of images of the person directly from the image capture device 2002. The type of connection may be either a wired or wireless connection.

In the example of FIG. 2 of the present disclosure, person 2000 is undergoing a measurement of one of more physiological parameters. Accordingly, the person 2000 stands in front of the image capture device 2002 such that the image capture device 2002 can capture a series of images of the person (with that series of images of the person being used in order to measure the one or more physiological parameters of the person—using rPPG measurement techniques or the like). The image capture device 2002 may capture a series of images over an interval of time such as 60 seconds or the like. However, the present disclosure is not particularly limited in this regard. The interval of time over which the images are captured may be much longer or much shorter than 60 seconds.

In some examples, the image capture device may capture images at a frame rate of 30 images per second. This would enable 30 different measurements of the skin colour of the person to be taken per second. However, the present disclosure is not limited to this frame rate (frequency of image capture) and the frame rate might be significantly higher or significantly lower than this example.

This series of images captured by the image capture device 2002 and acquired by the acquiring unit 3002 is the data from which the physiological parameters of the person can be determined (using the variations in the skin colour of the person over time).

In some examples, the acquiring unit 3002 of apparatus 3000 may control the image capture device 2002 to cause the image capture device 2002 to capture the series of images. In particular, the acquiring unit 3002 of apparatus 3000 may optimize one or more image capture settings of the image capture device 2002 for capture of the series of images of the person and may control the image capture device to capture the series of images of the person on this basis.

The image capture settings of the image capture device which are set and optimized by the acquiring unit 3002 of apparatus 3000 may include settings such as the exposure time, aperture, frame rate, resolution, optical zoom, digital zoom, white balance or the like of the image capture device. The acquiring unit 3002 of apparatus 3000 may set and optimize the image settings based on information regarding the type of image capture device. For example, certain types of image capture devices (such as webcams) may require certain settings (e.g. white balance adjustment) in order to provide the best series of images for the measurement of a physiological characteristic of a person. However, a different type of image capture device (e.g. a camera on a portable electronic device) may require different settings (e.g. resolution adjustment) to provide the best series of images for the measurement of the physiological parameter of the person. Therefore, the acquiring unit 3002 of apparatus 3000 may optimize the settings of the image capture device 2002 in accordance with the type of image capture device.

Alternatively, the acquiring unit 3002 of apparatus 3000 may set and optimize these image capture settings based on other factors such as a calibration image acquired from the image capture device. As an example, the calibration image may show that the image is too dark. Accordingly, based on this calibration images, it may be determined that the exposure time should be increased. However, the present disclosure is not particularly limited in this respect and any suitable factors can be used by the apparatus 3000 in order to set and optimize the settings of the image capture device 2002.

Thus, in some embodiments of the disclosure, apparatus 3000 may be configured to optimize one or more image capture settings of an image capture device for capture of the series of images of the person; and control the image capture device to capture the series of images of the person using these optimized image capture settings.

Once set and optimized, the image capture device may capture all images in the series of images of the person with these same image capture settings (i.e. lock the image capture settings for the duration of image capture). This ensures that the images of the person which are acquired by the image capture device have the same image capture settings which makes it easier to use the images in the measurement of a physiological parameter (as comparison between the different images of the series of images is more reliable).

In some examples, the image capture device 2002 from which the acquiring unit 3002 acquires the series of images can be part of any suitable electronic device including "smart" devices such as the personal telephone or tablet device of a user. This enables a user to easily take measurements of relevant physiological parameters from any suitable location.

While the acquiring unit 3002 of the apparatus 3000 may receive the series of images directly from the image capture device 2002 (e.g. for a substantially real time measurement of the physiological characteristics of the person), the present disclosure is not particularly limited in this regard. In other examples, the acquiring unit 3002 may be configured to receive a series of images from a storage device (on a server for example). The series of images acquired from the storage device may be images which have been captured by an image capture device and uploaded to the storage device. By acquiring the series of images from a storage device (on a server, for example) apparatus 3000 is able to perform measurement of a physiological parameter of a person on images on images which have been captured at an earlier time. This means the apparatus 3000 does not necessarily have to perform measurement of the physiological parameter at the same time as the images are captured by the image capture device 2002. This improves the flexibility of apparatus 3000 and enables the apparatus 3000 to be used in a wider range of situations.

Figure 4:
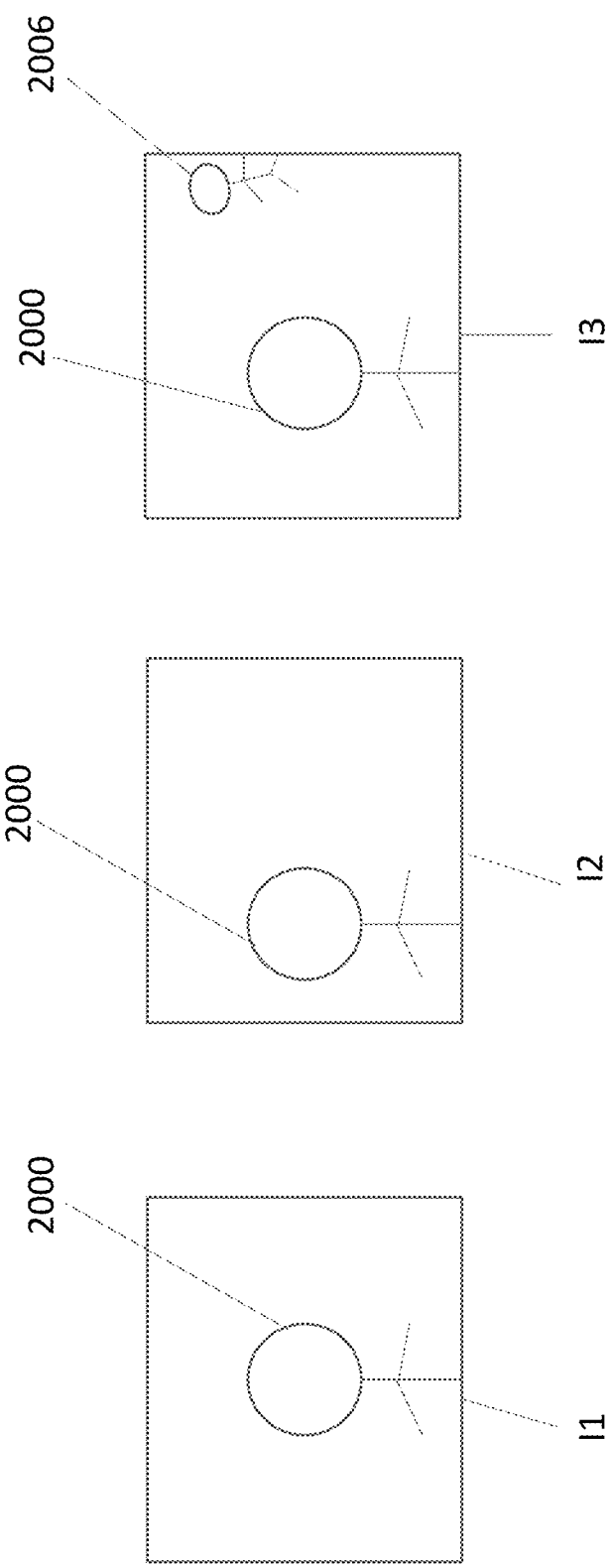
FIG. 4 illustrates an example series of images in accordance with embodiments of the disclosure.

Turning to FIG. 4 of the present disclosure, an example of a series of images of a person is shown. This image series comprises three images: image I1, image I2 and image I3.

In this example, image I1 is the first image in the image series. This image I1 is an image of a person captured at a first time T1. At least one skin exposed region of the person 2000 is shown in this image I1 (the face of person 2000 in this example). Image I2 is a second image in the series of images taken at a second time T2 (being a time after the first time T1). However, the location of the person 2000 within the image I2 has changed when compared to image I1. Finally, image I3 is a third image in the series of images taken at a time T3 (being a time after the second time T2).

A second person 2006 appears in the background of image I3 (in addition to person 2000 shown in the foreground of the image).

The series of images I1 to I3 is an example of a series of images as acquired by acquisition unit 3002 of apparatus 3000 from an image capture device for the measurement of a physiological parameter of the person. However, it will be appreciated that the present disclosure is not particularly limited to this example image series. The number of images in the series of images may be much greater than the number of images shown in the example series of images in FIG. 4 of the present disclosure.

Furthermore, it will be appreciated that in order for the physiological parameter of the person to be obtained from the series of images, the images of the series of images should include at least a skin exposed region of the person. This is because measurement of the physiological parameter of the person requires analysis of the slight variation in skin colour which occurs when the person's heart beats. Therefore, if the image does not include a skin exposed region, these variations in skin colour cannot be observed. Accordingly, at the time of image capture, one or more instructions may be provided to the person 2000 who is having their physiological parameter measured which inform the person 2000 that a skin exposed region (e.g. the face of the person 2000) should be visible in the images captured by the image capture device 2002.

In some examples, the series of images may form at least a portion of a video sequence of the person 2000. However, the present disclosure is not particularly limited in this regard and a number of individual images may instead form the series of images for use by apparatus 3000. Moreover, the images captured by the image capture device 2002 can have any suitable format (such as JPEG, PNG, RAW, or the like).

Once the series of images have been acquired by acquiring unit 3002 of apparatus 3000, they are passed to the partitioning unit 3004 for further processing.

<Partitioning Unit 3004>

As explained with reference to FIG. 3 of the present disclosure, apparatus 3000 comprises a partitioning unit 3004, which is configured to partition at least a portion of each image of the series of images into a plurality of image regions.

The partitioning unit 3004 may partition the images into a plurality of image regions. Each image region is an individual segment, or tile, of the image which can be independently processed. The partitioning unit 3004 may partition the images such that each image of the series of images has the same configuration of image regions. As such, the image regions are regularly sized across the series of images. However, in some examples (described in more detail later) a segmented-in-time method may be used by apparatus 3000 such that the image series is segmented into a number of independent time segments and the tiles amongst images in the same time segment are regularly sized. In this situation, the tiles may have a different configuration (size, shape or number) in different time segments.

Each image region (tile) of the image (and thus of each image of the series of images) can be used by apparatus 3000 in order to determine a signal quality indicator, which enables apparatus 3000 to select the tile or collection of tiles from each image which provide the strongest signal quality for measurement of the physiological characteristic of the person. That is, each tile provides an independent measurement which can be used in order to ascertain a resultant signal which can be used in order to more accurately measure one or more physiological characteristics of the person.

Figure 5A:
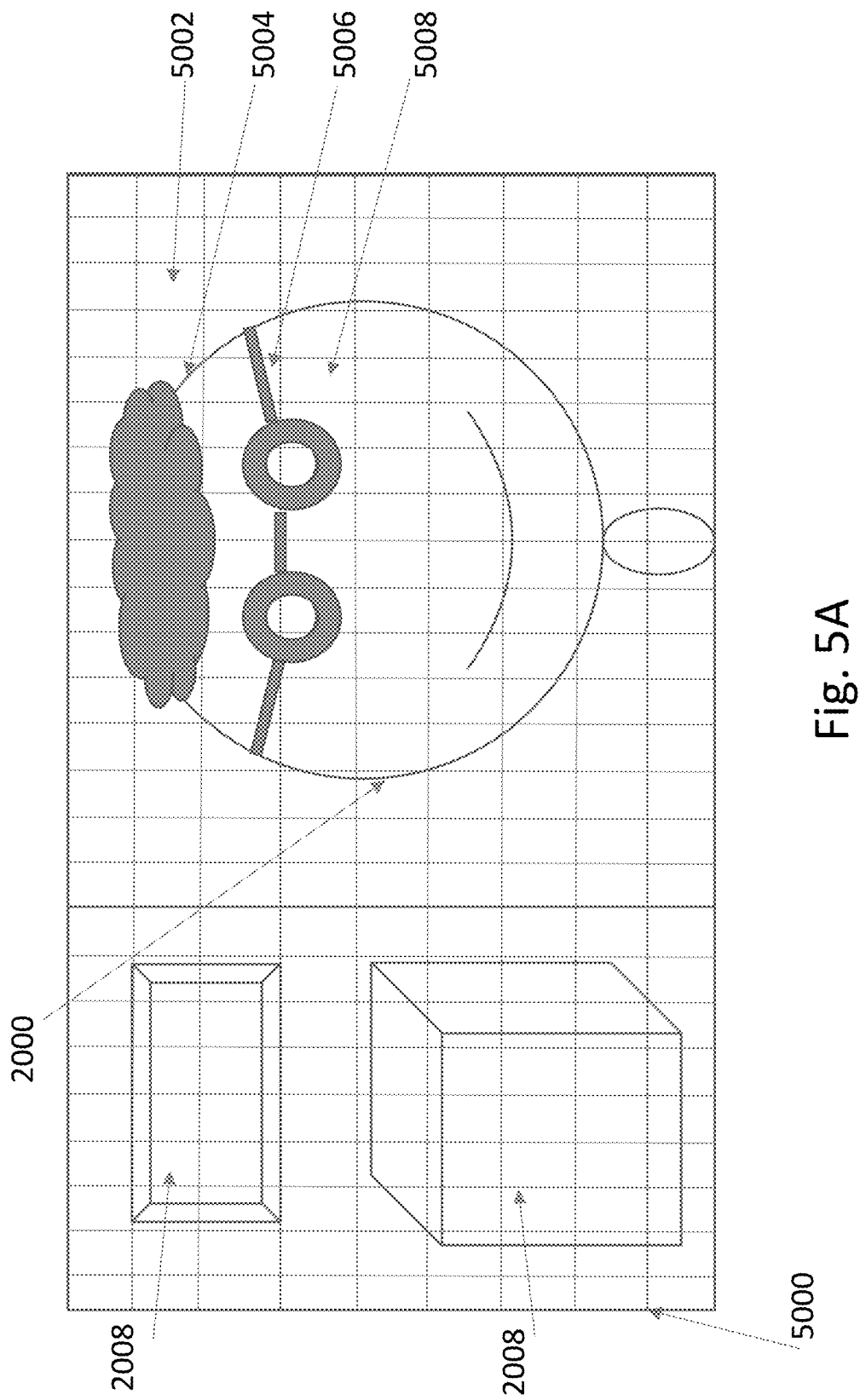
FIG. 5A illustrates an example of partitioning an image in accordance with embodiments of the disclosure.

Consider now FIG. 5A of the present disclosure. FIG. 5A of the present disclosure illustrates an example of partitioning an image in accordance with embodiments of the disclosure.

In FIG. 5A, an image 5000 of a series of images is shown. The image is an image of a person 2000 for whom one or more physiological parameters are being measured. A number of objects 2008 are also shown in the background of this image behind the person 2000.

As the person occupies only a portion of the image 5000, it will be appreciated that some of the image may be unsuitable for use in measurement of the physiological characteristics of the person. Moreover, while only a single image is shown in FIG. 5A, it will be appreciated that the image 5000 forms part of a series of images acquired by the acquiring unit 3002. The location of the person 2000 in the image 5000 may vary between images in this series of images. Moreover, certain external conditions (such as an external lighting source) may vary between images in this series of images. Accordingly, it can be difficult to ascertain which portion or portions of the image should be used for measurement of the physiological characteristic of the person. However, by partitioning the image 5000 into independent image regions (tiles) the best portion or portions of the image for measurement of the physiological characteristic of the person in each image of the series of images can be determined. Accordingly, partitioning the image 5000 into a plurality of independent tiles enables improvement in the accuracy and reliability of the measurement of the physiological characteristic of the person.

In this example, image 5000 has been partitioned by partitioning unit 3004 of apparatus 3000 into a number of individual image regions (tiles). The partitioning has been performed such that the image has been segmented into a number of regularly (or equally) sized image tiles. However, the present disclosure is not particularly limited in this regard. In other examples, partitioning unit 3004 may partition the image such that different sized tiles are present across the image. Nevertheless, it will be appreciated that the configuration of tiles in the image 5000 is replicated such that the other images in the series of images (or time segment of the series of images—explained in more detail later) have this same configuration of tiles. This enables direct comparison of tiles between respective images in the series of images.

In this example, a first tile 5002 is a region of the image 5000 which does not include any portion of the person 2000. As the tile 5002 does not include any portion of the person 2000, any variation in colour of the tile between images in the series of images will be due to external factors (noise) and will not be due to the signal (pulse of the person 2000).

A second tile 5004 is a region of the image 5000 which includes a portion of the person 2000. However, the amount of exposed skin of the person 2000 located in the tile 5004 is quite small. This is because the person 2000 only occupies a portion of the tile 5004 (with the remainder of the tile 5004 being occupied by the background). Moreover, the hair of the person 2000 covers some of the skin present in the tile 5004. Therefore, a variation in colour of the tile 5004 between images in the series of images may be due to a mixture of both external factors (noise) and signal (pulse of the person 2000).

A third tile 5006 is a region of the image 5000 which includes a portion of the person 2000. However, the amount of exposed skin of the person 2000 located in the tile 5006 is quite small. This is because the person 2000 wears glasses and the frame of the glasses covers some of the skin of the person in the tile 5006. Similar to tile 5004, the variation in colour of the tile 5004 between images in the series of images may be due to both a mixture of noise and signal.

Finally, a further image region 5008 is a region of the image 5000 which includes a portion of the person 2000. The exposed skin of the person 2000 occupies a large percentage of the tile 5008 in this example. Therefore, a large amount of the variation of the colour of the tile between images in the series of images may be attributable to the signal (pulse of the person). Nevertheless, an amount of noise will still be present in addition to this signal. The sources of noise may include mechanical noise, white noise, Gaussian noise, ambient lighting noise, periodic noise, aperiodic noise or the like. Therefore, even for a tile such as 5008 (which contains mainly exposed skin of the person) the signal will be mixed with noise.

Thus, it can be difficult to acquire a clean signal from the series of images when using a single image region (or tile). However, by combining signals from a plurality of independent tiles within the image, a stronger and more reliable signal can be extracted which enables a more accurate measurement of the physiological characteristic of the person to be performed.

The number of tiles which are created by the partitioning unit 3004 is not limited to the number of tiles illustrated in the example of FIG. 5A. The number of tiles which are created for the images of the series of images may be much higher or much lower than the number of tiles shown in this specific example. Indeed, the number of tiles which are created by the partitioning unit 3004 may vary in accordance with a number of factors such as the resolution of the image (with more tiles being created for a series of images with higher resolution images) the availability of processing resources (with more tiles being created for a series of images when more processing resources are available) a calibration setting (where a user or operator of apparatus 3000 can configure how many tiles should be created for the images) or the like. Moreover, while the tiles which have been generated by the partitioning unit 3004 in the example of FIG. 5A have a rectangular shape, the present disclosure is not particularly limited in this regard. In other examples, the set of tiles which are produced by the partitioning unit 3004 may have any shape such that the set of tiles collectively cover the entire image.

Therefore, it will be appreciated that each tile is an individual image region which is processed by the apparatus 3000 in order to identify the portion or portions of the image with the best signal quality for measurement of the physiological parameter of the person 2000. As such, in the present disclosure, the image segmentation performed by partitioning unit 3004 is a process of partitioning each image of the series of images into multiple image tiles (sets of pixels). However, the processing performed in order to generate these tiles is not particularly limited and any suitable technique may be used by the partitioning unit 3004 as required depending on the situation to which embodiments of the disclosure are applied.

In the example of FIG. 5A of the present disclosure, the entire image 5000 has been partitioned into tiles by partitioning unit 3004 of apparatus 3000. However, the present disclosure is not particularly limited in this regard. In some examples, the partitioning unit 3004 may perform image processing or image analysis in order to identify an image region (or regions) of interest. Such a region of interest may be any region of the image containing a feature of interest. The partitioning unit 3004 of apparatus 3000 may then be configured in order to partition the image such that only the region (or regions) or interest as segmented into image tiles. In some examples, this analysis is performed on the first image in the series of images, and then replicated across all images in the series of images. Therefore, the region of interest around the person which has been identified should then be large enough to enable accurate measurement even if the location of the person changes between the images (i.e. such that if they move, they still remain within the series of images).

Figure 5B:
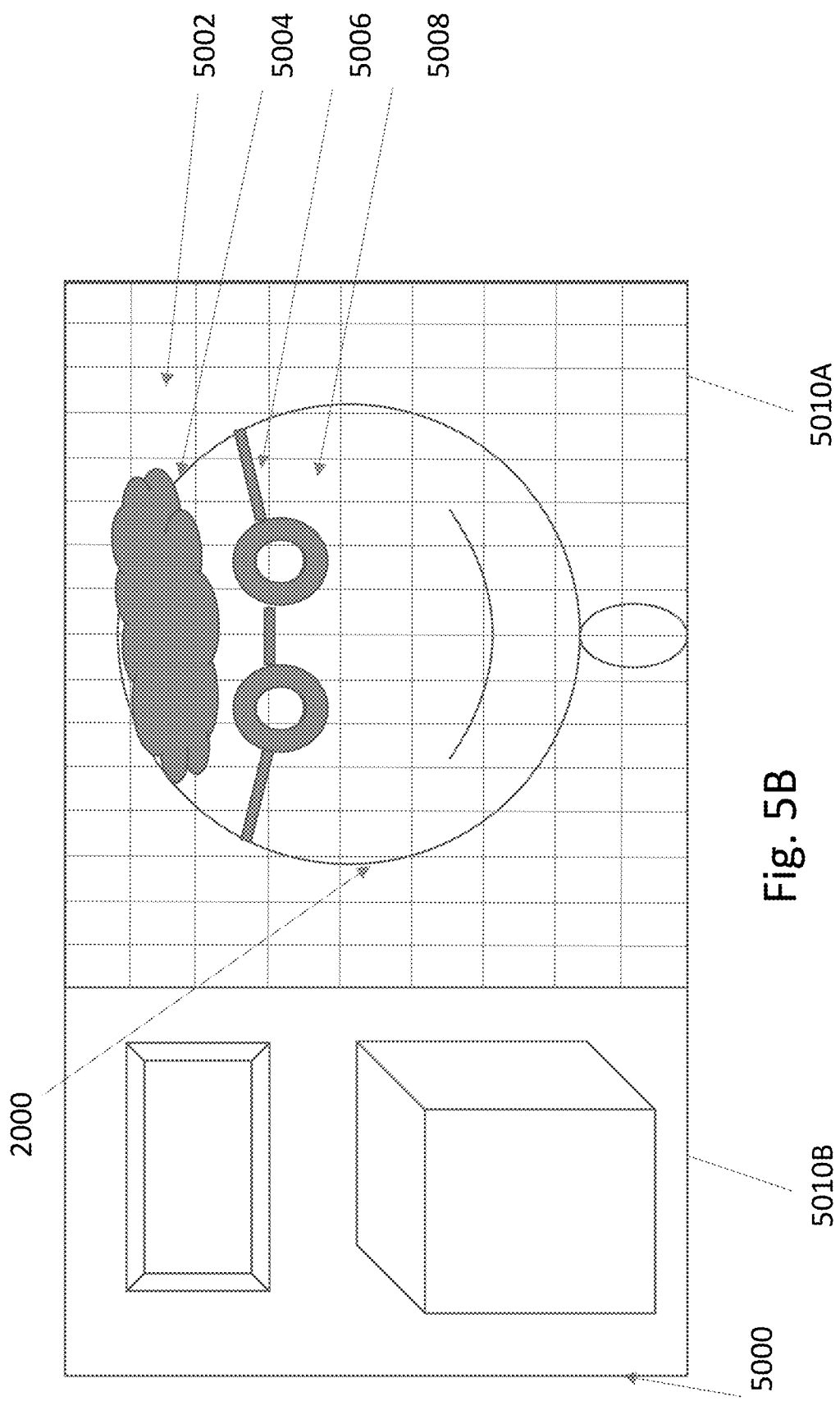
FIG. 5B illustrates an example of partitioning an image in accordance with embodiments of the disclosure.

Consider the example of FIG. 5B of the present disclosure. In this example, the partitioning unit 3004 has performed image analysis on the image 5000 in order to identify one or more regions of interest in the image 5000. In this example, a region of interest is a region of the image which includes a face. As such, the partitioning unit 3004 may have performed image recognition processing in order to identify a region of the image which includes a face. Once this image recognition processing has been performed, the partitioning unit 3004 of apparatus partitions the region of interest which has been identified (i.e. the portion of the image which contains a face, namely region 5010A in this example) into a number of individual tiles (including tiles 5002, 5004, 5006 and 5008). The process of partitioning the image into tiles is the same as described with reference to FIG. 5A of the present disclosure and will not be described again with respect to FIG. 5B for brevity of disclosure. However, it will be appreciated that in the example of FIG. 5B, the regions of the image which have not been identified as regions of interest (e.g. region 5010B) may be discarded from further analysis and may therefore not be partitioned into tiles by partitioning unit 3004 of apparatus 3000.

Thus, in embodiments of the disclosure, partitioning the images of the series of images may include analysing the image of the person to detect one or more features of interest in the image and selecting the at least a portion of each image as at least a portion of the image comprising one or more features of interest. As such, only an area of the image corresponding to this feature of interest will then be partitioned by the partitioning unit 3004 of apparatus 3000.

While in the example of FIG. 5B of the present disclosure, the region of interest is a region of the image which contains a face of the user, the present disclosure is not particularly limited in this regard. The region of interest may further include any region of the image which includes one or more specified or predetermined facial landmarks such as at least one of the eyes, nose, mouth, cheeks, ears, forehead or chin of the person. These specified facial landmarks are regions of the face of the person which may provide the most accurate measurement of a physiological characteristic of the person, as these specified facial landmarks correspond to portions of the person's face which are known to often demonstrate the strongest variation in skin colour when their heart beats.

The cheeks and forehead are computationally efficient for rPPG because of their large area and good-quality signal. The infraorbital artery, which perfuses the cheek, is potentially a good candidate for rPPG because it has a strong pulsatile blood flow and is less sensitive than the forehead and mouth to acute physiological stimuli (e.g. temperature, taste or emotions). However, the infraorbital artery shows wide inter-individual variation anatomically, with five distinct phenotypes based on the number of branches. Blood flow in the lower forehead and bridge of the nose are supplied by the internal carotid artery, which is influenced by autoregulation of cerebral blood flow and thus may not accurately reflect systemic blood pressure, whereas blood flow to the upper forehead, tip of the nose, cheeks, lips and chin originates from the external carotid artery, which is not influenced by cerebral autoregulation and is therefore more closely aligned with systemic blood flow. However, signal quality from the nose, mouth and chin shows large inter-person variability.

Accordingly, the colour changes within the face of the individual (and in particular, the colour changes in the face of the individual in proximity to the facial landmarks) are currently believed to provide the best results for detecting the heart rate of the individual. Additionally, the colour changes within the face can be used in order to derive other vital signs, such as respiration (breathing rate), blood pressure and Heart-Rate Variation (HRV) for example.

However, regions of interest may, more generally, include any portion of the image which includes exposed skin or an exposed skin candidate (i.e. something which might be exposed skin).

The image processing which is performed in order to detect the region of interest will depend on the type of region of interest being identified and is not limited to facial recognition. For example, identification of regions of the image which include exposed skin of the user may be based on any suitable technique such as template matching, colour recognition, machine learning or the like.

By first identifying the region or regions of interest in the image before partitioning the image into tiles, the partitioning unit 3004 of apparatus 3000 can ensure image tiles are more efficiently created for the image (as generation of tiles in regions of the image which are not regions of interest is supressed). Thus, apparatus 3000 can more efficiently measure the physiological parameter of the person 2000. Moreover, by first identifying the region or regions of interest in the image before partitioning the image into tiles, one or more background objects in the image 5000 can be removed from further analysis. This reduces the impact these background objects will have on the accuracy of the measurement of the physiological parameter of the person 2000.

While the examples of FIGS. 5A and 5B of the present disclosure have described the process of partitioning a single image into tiles, it will be appreciated that the partitioning unit 3004 of the present disclosure performs this same process on each image of the series of images which has been acquired by the acquiring unit 3002.

In this way, the partitioning unit 3004 is able to partition at least a portion of each image of the series of images into a plurality of image regions (or tiles). These image regions are then passed to the computing unit 3006 of apparatus 3000 for further processing and analysis.

<Computing Unit 3006>

As explained with reference to FIG. 3 of the present disclosure, apparatus 3000 comprises a computing unit 3006 which is configured to compute target colour value for each image region of each image of the series of images.

The apparatus 3000 of the present disclosure utilizes variations in skin colour of a person over time (i.e. between images of the series of images) in order to provide measurement of a physiological parameter of a person. This is because there will be variation between the skin colour of a person over time in accordance with their pulse. However, as these are only slight skin colour variations, any very large power frequency components can cause much higher variations in the colour in the image. Moreover, while certain regions of a person's face (such as a forehead) may, in general, provide the best colour variation, it may be that, in certain images, said region does not provide as good an indication of the colour variation for a person. As an example, if a portion of the person's forehead is covered with hair (as in the tile 5002 of the example of FIGS. 5A and 5B) the usefulness of that region of the person's face for detecting colour variation correlating to the person's pulse (and thus the usefulness of that region of the person's face for measurement of the physiological parameter of the person) may be significantly reduced. Thus, even though a specific region portion of the image (e.g. the forehead of the person) should, in general, provide a strong signal which can be used for measurement of the physiological characteristic of the person, it may be that in the specific case that portion of the image does not actually provide a strong signal.

Accordingly, in embodiments of the present disclosure, each tile of the image produced by the partitioning unit 3004 is individually assessed in order to quantitatively decide whether that tile is a good candidate for a high quality measurement of the physiological parameter of the person.

In order to assess whether or not the tile is a good candidate for high quality measurement of the physiological parameter of the person, it is first necessary to obtain a measurement of the colour signal (target colour value) of that tile. This enables the variation in colour values of the tile (and thus the signal quality) across the series of images to be assessed.

Accordingly, the computing unit 3006 of apparatus 3000 separates the image (for each tile) into its constituent Red, Green and Blue (R, G, B) signals. A mean colour signal in each of the constituent colours is then computed for each tile in each image of the series of images (i.e. across the pixels contained within that tile). The mean colour signal in each of the constituent colours for a given tile may be an average of the colour value of all pixels in that tile for that constituent colour. For example, taking the Red constituent colour as an example of a target colour, if a tile consisted of 100 pixels (e.g. if the tile was 10 pixels wide and 10 pixels high) then the Red colour value of each pixel of these 100 pixels in a first image of the series of images would first be measured by the computing unit 3006. Then, the Red colour value of each of these 100 pixels would be added together by the computing unit 3006. Finally, the computing unit 3006 would divide this sum of the Red colour values by 100 in order to compute the mean (or average) Red colour value of the pixels of the tile the first image. This mean value would then be the target colour value of the tile in the first image of the series of images.

The computing unit 3006 may then compute the target colour value of the same tile in each of the other images of the series of images in the same way.

In some examples, the computing unit 3006 may compute the target colour values for each image region of each of the series of images for more than one colour. That is, the target colour values of the tile for one or more of the Red colour, Green colour and Blue colour signals may be computed by the computing unit 3006. However, in other examples, the target colour values for a single colour signal (such as the Red colour signal) may be computed by the computing unit 3006.

Consider the example of FIG. 5B of the present disclosure. In this example, a region of interest 5010A of image 5000 (being a region of the image containing a person's face) has been partitioned into a number of tiles by partitioning unit 3004 of apparatus 3000. These tiles are then passed to the computing unit 3006. The computing unit 3006 then separates the image (for each tile) into its constituent colour signals (i.e. the R, G, B colour signals) and computes the mean colour value of each tile for each of these constituent colour signals as a target colour value for each tile. As an example, tile 5006 of image 5000 may have a first target colour value (e.g. a first mean Red colour signal) while tile 5008 may have a second target colour value (e.g. a second mean Red colour signal). The computing unit 3006 may then calculate the target colour values for the corresponding tiles for all other images in the series of images. Taking tile 5008 as an example, the computing unit 3006 may calculate the target colour value of this tile 5008 across all images in the series of images.

Once the target colour values for each image region (tile) of each image of the series of images has been computed by the computing unit 3006 of apparatus 3000, these target colour values are passed to the determining unit 3008 for determination of a signal quality indicator.

<Determining Unit 3008>

As explained with reference to FIG. 3 of the present disclosure, apparatus 3000 further includes a determining unit 3008 which is configured to determine a signal quality indicator of each of the plurality of image regions for the series of images from the target colour values. This enables image regions (or tiles) which are the best candidates for measurement of the physiological parameter of the person to be identified.

The way in which the determining unit 3008 of apparatus 3000 determines the signal quality indicator of each of the plurality of image regions for the series of images from the target colour values is not particularly limited in accordance with embodiments of the disclosure. However, in order for the image regions (tiles) which are good candidates for recovering high quality measurement of the physiological parameters of the person to be identified, a suitable metric indicative of the signal quality of each of the plurality of image regions should be computed.

As explained earlier, variations in the colour of a tile over time may occur for a number of reasons. The variation in colour of the tile over time (i.e. between images in the series of images) is the intended signal. All other variations in colour over time are noise. The signal quality is an indicator which expresses how much of the colour variation is caused by the signal and how much of the colour variation is caused by the noise. Tiles with a strong, clean, signal are the tiles which can be used most reliably in the measurement of the physiological characteristic of the user.

There are a number of different ways of measuring the signal quality of the tile and the present disclosure is not particularly limited to any given technique. However, as an example, signal-to-noise ratio (such as signal to noise ratio in the frequency domain) can be used as a signal quality indicator in accordance with embodiments of the disclosure. In this example, the determining unit 3008 calculates the signal noise ratio from the power spectral density of the signal. To do so, it finds the power in the fundamental and the second harmonic frequency of the pulse and compares it to the power outside these frequency regions (considered to be the noise power). This is explained in more detail later with respect to FIG. 6A of the present disclosure.

Notably, not all tiles in the image (or series of images) of the person acquired by the acquiring unit 3002 from the apparatus 3000 may comprise a signal.

Consider FIG. 5B of the present disclosure. In this example, an image 5000 as captured by an image capture device 2002 is shown. A region of interest 5010A has been identified in this image (being a region of the image which contains a face of the person 2000). This region of interest 5010A has been partitioned into a number of tiles by the partitioning unit 3004 of apparatus 3000. The tiles which have been produced by partitioning unit 3004 include tiles 5002, 5004, 5006 and 5008.

Of these example tiles, the tile 5002 is a tile which does not actual contain any exposed skin of the person 2000. Therefore, within this tile (across the entire series of images) there will be no variation of the target colour values over time being caused by the pulse of the person. Any variation of the target colour values over time which are observed for tile 5002 will be caused by noise or external factors (e.g. changes in lighting or the like). These changes will be random and will not display systematic variation over the time. Therefore, the signal quality of a tile such as tile 5002 across the series of images will be very low (as it may contain no actual signal).

However, a tile such as tile 5004 or 5006 contains at least some exposed skin of the user. Therefore, these tiles will contain a signal which can be used in the measurement of a physiological characteristic of a person. However, the signal quality of a tile such as 5004 or 5006 will likely be lower than the signal quality of a tile such as 5008 (which predominately contains exposed skin of the user).

As explained, one example of a signal quality indicator which can be used in accordance with embodiments of the disclosure is the signal-to-noise ratio in the frequency domain. Indeed, as a specific example, the signal-to-noise ratio in the frequency domain (SNR-F) of the green channel may be used as the signal quality indicator. The green channel may give the highest SNR due to absorbance from haemoglobin and oxyhaemoglobin (compared with the blue and red channels).

Figure 6A:
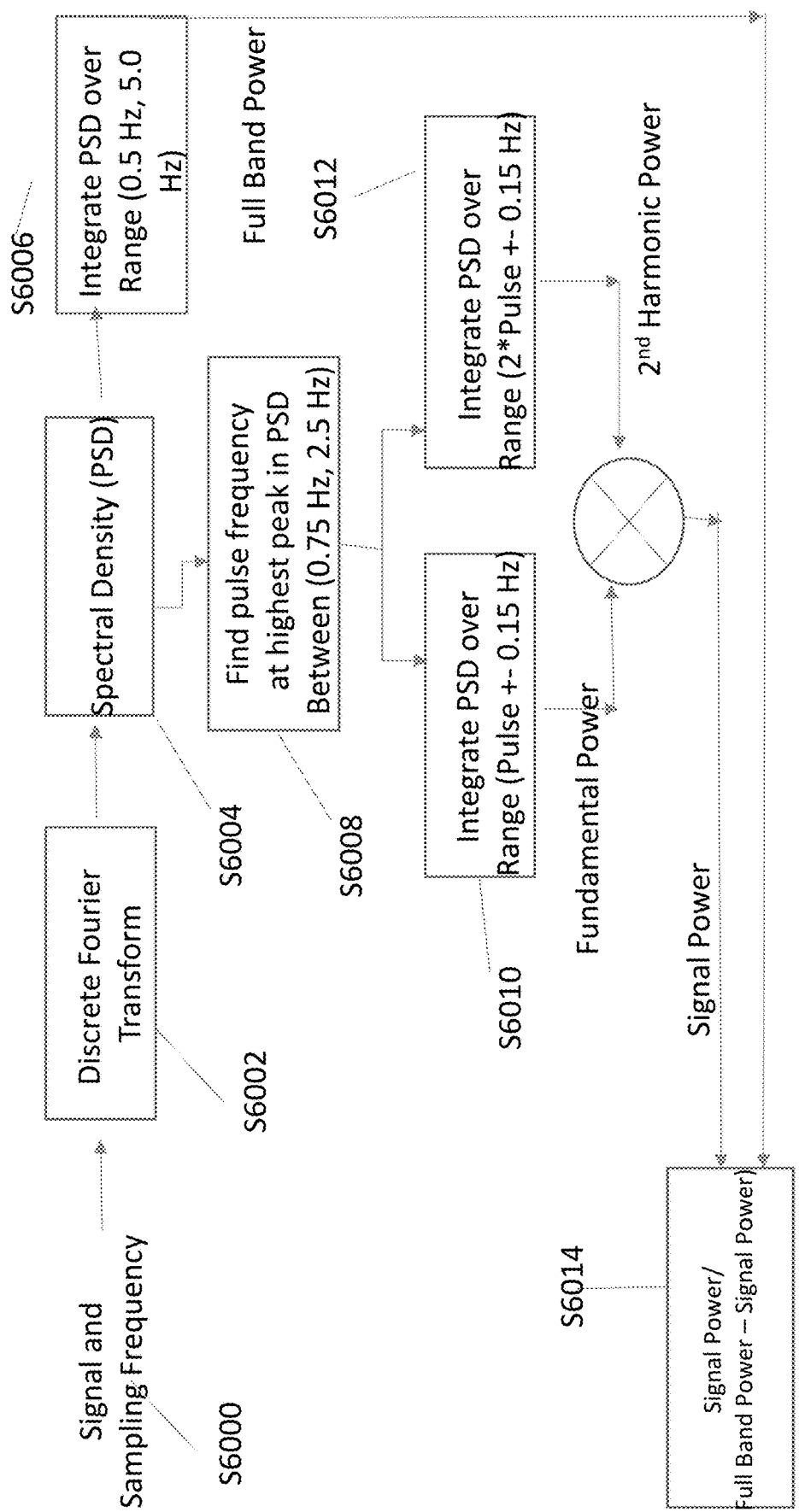
FIG. 6A illustrates an example system for determining a signal quality indicator in accordance with embodiments of the disclosure.

FIG. 6A of the present disclosure illustrates an example system for determining a signal quality indicator in accordance with embodiments of the disclosure. More specifically, FIG. 6A provides an example of processing steps which can be performed by the determining unit 3008 of apparatus 3000 in order to determine the signal-to-noise ratio (SNR-F) in the frequency domain for the tiles. Furthermore, an example of the use of the SNR-F in the derivation of a resultant signal is described hereinafter with reference to FIG. 6B of the present disclosure.

In this example, at step S6000 the determining unit 3008 is configured to receive the signal (target colour value of a tile across the series of images) and sampling frequency (frequency of image capture in series of images) as input for a given tile for the series of images.

In step S6002, the determining unit 3008 is then configured to perform a Discrete Fourier Transform on this input in order to covert the signal into its frequency components. This provides a frequency domain representation of the input received by the determining unit 3008.

Then, in step S6004, a power spectral density (PSD) of the signal in the frequency domain is computed from the frequency domain representation of the input. This PSD provides a measure of the signal's power content versus frequency (which indicates the frequencies around which the signal's power is concentrated).

In order to compute the full Band Power, the determining unit 3008 is then configured to integrate the PSD of the signal over the range (0.5 Hz, 5.0 Hz). This provides an indication of the total power (noise and target signal) in the signal.

While integrating the PSD in step S6006 provides an indication of the total power in the signal, it does not in itself provide an indication of the signal quality. A stronger signal (with more power) may occur owing to a large amount of power in frequencies which are unrelated to the pulse of the person (e.g. from noise sources). Therefore, in addition to the total power, determining unit 3008 must compute the power in the target signal (i.e. the pulse).

Accordingly, in step S6008, the determining unit 3008 is configured to find the pulse frequency in the signal. In this example, the pulse frequency is assumed to be the highest peak in the PSD (i.e. the strongest signal) between the range of 0.75 Hz and 2.5 Hz. This range of 0.75 Hz and 2.5 Hz is used in order to restrict the range over which the pulse of the person is to be found. A pulse frequency outside of this range is physiologically improbable and therefore strong peaks outside of these frequency range can be discounted from the search for the pulse of the person. By searching for the pulse frequency in the signal in this manner, the determining unit is able to perform an assessment of the signal quality of a tile even when no additional information (such as the pulse of the person) is known.

Once the highest pulse signal in the frequency domain has been computed (i.e. once the pulse has been located), the determining unit 3008 is configured, in step S6010, to integrate the PSD over the range of the pulse (i.e. the identified pulse frequency +−0.15 Hz). By including an additional range around the identified pulse frequency (i.e. +−0.15 Hz in this example) the determining unit 3008 can ensure that the full power of the pulse signal is accounted for across the series of images, even if there are small changes in the pulse rate of the person. However, the present disclosure is not particularly limited to this specific range and a different value can be used depending on the situation to which the embodiments of the disclosure are applied.

Integrating the PSD over this range provides an indication of the power in the signal which is directly related to the pulse of the person. Furthermore, in this example, the $2^{nd}$ Harmonic power is also computed by the determining unit 3008, in step S6012, by integrating the PSD of the range of (2*pulse frequency +−0.15 Hz). The total signal power in the pulse is then the fundamental power plus the $2^{nd}$ Harmonic power.

Finally, the signal to noise ratio in the frequency domain is computed by the determining unit 3008 in step S6014 by the equation:

$$SNR-F = \frac{\text{Signal Power}}{\text{Full Band Power} - \text{Signal Power}} \quad (1)$$

where SNR-F is the signal to noise ratio in the frequency domain.

Accordingly, in some embodiments of the disclosure, determining the signal to noise ratio comprises, for each image region across the series of images, performing a discrete Fourier Transform on the target colour values of each image region, calculating the power spectral density of the image region, determining a fundamental power in fundamental harmonic frequency bands, and comparing the fundamental power in the fundamental harmonic frequency bands to power outside the fundamental harmonic frequency bands as described with reference to the example of FIG. 6A.

In this way, determining unit 3008 is able to compute the signal to noise ratio in the frequency domain for a tile in the images of the series of images. The signal to noise ratio in the frequency domain for a tile is therefore an example of a signal quality indicator which can be used in accordance with embodiments of the disclosure.

As explained in the example of FIG. 6A of the present disclosure, the determining unit 3008 identifies the pulse frequency for the tile across the series of images by finding the highest peak in the power spectral density between 0.75 Hz and 2.5 Hz. In most situations, the highest peak in the power spectral density in this frequency range will correspond to the pulse frequency. However, in some examples, it may be desirable that a more accurate determination of the pulse frequency is made in the determination of the signal to noise ratio in the frequency domain. In this situation, a guided version of the process of FIG. 6A of the present disclosure can be performed, where the determining unit 3008 takes an additional input of the pulse frequency. This pulse frequency can be obtained through clinical ground truth readings for example. Then, instead of finding the pulse frequency at as the highest peak in the power spectral density in the range 0.75 Hz to 2.5 Hz (step S6008), the determining unit 3008 may use the input pulse frequency and integrate the power spectral density over the range of the input pulse frequency +−0.15 Hz in order to compute the fundamental power. This can further improve the accuracy of the measurement of the physiological parameter of the person.

Of course, while the process of FIG. 6A of the present disclosure is described with reference to a single tile (across the full series of images) it will be appreciated that this same process is then performed for all tiles which have been produced by the partitioning unit 3004 (across the full series of images). This enables the signal to noise ratio in the frequency domain for all tiles across the full series of images to be computed. Likewise, while described with reference to the signal for a single colour component (e.g. Red) in this example, the same process may be performed for other colour components of the series of images (e.g. Green and/or Blue).

Furthermore, it will be appreciated that the signal to noise ratio in the frequency domain is merely one example of a signal quality indicator which can be computed by the determining unit 3008 using the target colour values which have been computed for each tile in the series of images. Any suitable signal quality indicator which can be used to indicate the signal quality of the individual tiles across the series of images can be used in accordance with embodiments of the disclosure depending on the situation to which embodiments of the disclosure are applied. Therefore, the present disclosure is not particularly limited to the determination of the signal to noise ratio in the frequency domain as an example of the signal quality indicator. In particular, in some examples a signal quality metric optimised to specific vital signs may be used, allowing emphasis on the quality of the most relevant aspect of the pulsatile signal for a given vital sign.

By determining a signal quality indicator of each tile for the series of images, the tiles (image regions) of the set of images which have the strongest signal can be identified. These tiles (image regions) are the tiles from which the most accurate measurement of the physiological parameter of the person can be performed.

Once the determining unit 3006 has determined a signal quality indicator for each tile of the series of images, this information is passed to the classifying unit 3008 of apparatus 3000 for further processing.

<Classifying Unit>

As explained with reference to FIG. 3 of the present disclosure, apparatus 3000 further comprises a classifying unit 3010 configured to classify the plurality of image regions in accordance with the signal quality indicator which has been determined.

As explained with reference to FIG. 5B of the present disclosure, each image of the series of images is partitioned into a number of discrete tiles by the partitioning unit 3004 of apparatus 3000. Each of these tiles is an individual region which can be used in order to obtain a measurement of a physiological characteristic of the user across the series of images. That is, the pulse of the user can be measured from slight colour variations of the tile over the series of images. The frequency of the colour variations for a given tile corresponds to the pulse of the user. However, other factors such as movement of the user, changes in external lighting or the like may also affect the colour variation of the tile over the series of images. As such, the signal quality (the strength of the pulse signal) which can be obtained may vary for different tiles. Some tiles may provide a stronger signal (with the colour variation more strongly correlated to the pulse) while other tiles may provide a weaker signal which is more dominated by noise in the image. By receiving the signal quality indicator from the determining unit 3006, the classifying unit 3010 is able to identify which of the tiles have the strongest signal and thus which of the tiles should be used in the measurement of the physiological parameter of the user.

In some examples, the classifying unit 3010 of apparatus 3000 may identify that the tile with the single highest signal quality indicator (such as the tile with the highest signal to noise ratio) and then use this tile as the tile from which a measurement of the physiological characteristic of the user should be made. This enables the best image region for measurement of a physiological characteristic to be identified and used in the measurement of that characteristic for each measurement which is taken. However, by limiting the data to only the single tile with the highest signal quality indicator, a significant amount of data from the other tiles in the image which could contribute to the measurement of the physiological parameter of the user may be unnecessarily discarded.

Therefore, in order to maximise the information which can be extracted from the series of images and thus obtain a more reliable measurement of the physiological parameter of the user, the classifying unit 3010 may classify the tiles in the image based on the signal quality indicator such that an ensemble or aggregation of tiles can be used for the measurement of the physiological parameter of the user. That is, in some examples, an aggregation of tiles can be produced based on a classification score attributed to each tile in accordance with the signal quality indicator which has been determined. This provides a resultant signal (aggregated across the relevant tiles in the images) which can be used in order to measure the physiological characteristics of the person.

In order to produce the resultant signal, the classifying unit may perform steps of 1) an initial tile selection (which can include, in some examples, selection of all tiles), 2) an optional refinement of the title selection and 3) signal aggregation processing.

In order to perform the initial tile selection, the classifying unit may select tiles from the plurality of tiles based on the classification score attributed to each tile.

In some examples, the classification score may be the signal quality indicator of the tile. In other examples, the classification score may be an additional parameter calculated from the signal quality indicator of the tile which has been received from the determining unit 3006. For example, tiles with a signal quality indicator above a first threshold value could be attributed with a first classification score, while tiles below this first threshold value (but above a second, lower, threshold value) could be provided with a second classification score. Thus, in some embodiments of the disclosure, classifying the plurality of image regions in accordance with the signal quality indicator comprises generating a classification score for each image region.

In order to select the aggregation of tiles, the classifying unit 3010 may be configured obtain the signal quality indicator for each tile across the series of images (full signal period) and then select the signals in the best N tiles (i.e. the tiles with the highest score). N may be any number of tiles more than 1. As an example, the classifying unit 3010 may select the best 20 tiles (i.e. the 20 tiles with the highest signal quality indicator). However, the number N is not particularly limited in this regard and may be significantly more than 20. Once the classifying unit 3010 has selected the best N tiles, the signals in the best N tiles may be averaged together into one signal. This resultant signal produced by the classifying unit 3010 is the signal which can then be used in order to measure the physiological parameter of the person.

Thus, in some embodiments of the disclosure, classification further includes selecting the image regions with the best classification score and performing the measurement of the physiological parameter of the person on this selected image region.

Alternatively, in order to select the aggregation of tiles, the classifying unit 3010 may be configured to obtain the signal quality indicator for each tile across the series of images (full signal period) and then select the signals in the best M % of tiles. M may be any number above 0 up to 100. For example, the tiles with the top 50% of signal qualities or the tiles with the top 60% of signal qualities may be selected by the classifying unit 3010. These best M % of tiles may then be averaged together into one signal. This resultant signal produced by the classifying unit 3010 is the signal which can then be used in order to measure the physiological parameter of the person. Advantageously, by selecting the best M % of tiles, the number of tiles which are selected by the classifying unit 3010 will vary in accordance with the number of tiles produced by the partitioning unit 3004 of apparatus 3000.

Thus, in some embodiments of the disclosure, classification further includes selecting image regions where the classification score satisfies a predetermined condition (such as the best M % of tiles) and performing the measurement of the physiological parameter of the person on the selected image regions.

When creating the resultant signal from the aggregation of tiles using either the best N tiles or the best M % of tiles, only the tiles with the strongest signal will be included in the resultant signal (from which the physiological parameter of the person is determined). Advantageously, this means that the tiles with the strongest signal contribute to the measurement of the physiological parameter, while the tiles with the weakest signal (which may be dominated by noise) will not contribute to the measurement of the physiological parameter. This improves the accuracy and reliability of the measurement of the physiological parameter in a situation such as that described with reference to FIG. 2 of the present disclosure, where certain regions in an image captured by the image capture device 2002 may be unsuitable for measuring the physiological parameter of the person.

However, in some examples, it may be advantageous if all tiles in the image contribute to the measurement of the physiological parameter of the person (to maximise the information obtained from the series of images). Therefore, in some examples, the classifying unit 3010 may select all tiles for use in extraction of the signal (which is then subsequently used for measurement of the physiological parameter of the person). This enables all tiles to contribute to the production of the resultant signal (however, it will be appreciated that the contribution from each tile may not be equal depending on the aggregation method used to aggregate the tiles).

Furthermore, as an alternative example, the classifying unit may select all tiles with a signal quality indicator above a threshold value for the initial selection of tiles which should be used in the generation of the resultant signal. By selecting the tiles based on a threshold value, the number of tiles which contribute to the generation of the resultant signal is not limited. Instead, all tiles with a signal quality indicator above a threshold value can contribute to the resultant signal. This may maximize the amount of information obtained from the series of images while excluded tiles with a lower signal quality indicator from the calculation.

Moreover, in some examples, the classifying unit 3010 may be configured to make an initial selection of tiles by selecting tiles in accordance with their location in the image or series of images. For example, the classifying unit 3100 may select all tiles in proximity of a certain region of the face (e.g. all tiles on/around the forehead of a person). This ensures that tiles which are located around image features known to show a strong correlation with the pulse of the user (such as a region on the forehead of the person) can be included in the generation of the resultant signal performed by the classifying unit.

Thus, the classifying unit 3010 can make an initial selectin of the tiles from the plurality of tiles based on the classification score attributed to each tile.

Optionally, the classifying unit 3010 can perform a refinement of the tiles which have been selected (regardless of the method used for initial tile selection) before aggregating the tiles to produce the resultant signal. Refinement of the tile selection enables one or more additional characteristics of the tiles to be used in combination with the classification score to ensure that an optimum selection of tiles has been performed.

In some examples, in order to refine the selection which has been made (based on the classification score) the classifying unit 3010 may select any additional tiles in a largest group of similar signals (e.g. by using a similarity based clustering algorithm such as a k-means clustering algorithm). This ensures that if certain tiles have been selected (e.g. the best N tiles) any additional tiles which form a largest group of similar signals will also be included in the selection.

Alternatively, in some examples, in order to refine the selection which has been made, all tiles in a largest continuous block on the face may be selected (i.e. to prevent selection of a lone tile which has no other high quality tiles in proximity). In other words, isolated tiles which have been selected in the initial selection may be excluded during the refinement processing.

The refinement of the tile selection in this manner can thus further improve the strength of the resultant signal obtained by the classifying unit 3010.

Once the selection of the tiles has been made by the classifying unit 3010, the classifying unit 3010 may then generate the resultant signal.

The manner by which the classifying unit generates the resultant signal is not particularly limited in accordance with embodiments of the disclosure. However, it will be appreciated that the classifying unit generates the resultant signal accordance with the signal quality indicator which has been determined. This ensures that tiles with the best signal quality indicator contribute strongest to the resultant signal.

In some examples, the classifying unit 3010 may classify the tiles using a weighted aggregation scheme in order to produce the resultant signal. In particular, the classifying unit 3010 may obtain the signal quality indicator for each tile across the series of images (full signal period) and then generate a weighted average of the signals of these tiles (or a selection of these tiles) as the resultant signal using the equation:

$$\text{output} = \text{sum} \frac{\text{score}_i * \text{tile}_i}{\text{sum (score}_i)} \quad (2)$$

where output is the resultant signal produced by the classifying unit 3010, $\text{score}_i$ is the classification score (such as the signal quality indicator) for a tile i amongst all the tiles created by the partitioning unit 3004, and where the sum is conducted over all tiles which have been created by the partitioning unit 3004 (or, alternatively, all tiles which have been created and selected).

Thus, in some embodiments of the disclosure, classification further includes performing a weighted aggregation of the plurality of image regions in accordance with the classifications score for each image region. Then, measurement of the physiological parameter of the person can be performed using the weighted aggregation (resultant signal).

In this way, all tiles (image regions)—or all selected tiles—contribute to the resultant signal obtained from the images captured by the image capture device (the series of images). However, these image regions contribute to the resultant signal only in accordance with their own signal quality. That is, a tile with a higher signal quality indicator will contribute to the resultant signal more strongly (with a higher weighting) than a tile with a lower signal quality indicator. This ensures that the signals with the highest signal quality dominate the resultant signal whilst ensuring that the maximum information is extracted from the images since all tiles contribute to the production of the resultant signal. Tiles which do not contain a clear signal or which are dominated by noise will contribute negligibly to the production of the resultant signal.

In addition, in some examples (where a selection has been made based on the signal quality of the tiles) the tile aggregation processing performed by the classifying unit 3010 may be performed on a sum or mean of all selected tiles. In this case, since the tiles have been selected in accordance with their signal quality, the resultant sum or mean still reflects the signal quality of the tiles.

Furthermore, it will be appreciated that the present disclosure is not particularly limited to the above-described methods for classifying the tiles in order to produce the resultant signal. In some examples, the classifying unit 3010 may be configured to classify the tiles in a different way in order to produce the resultant signal for measurement of the physiological parameter in accordance with the signal quality which has been determined.

In addition, it will be appreciated that while the production of the resultant signal based on the classification of the classifying unit 3010 has been described with reference to a single signal (i.e. a single colour value) the present disclosure is not particularly limited in this regard. Rather, the classification unit 3008 may produce a resultant signal for each of the independent colour channels of the image series (i.e. an independent Red, Green and Blue resultant signal). Each of these independent resultant signals may be generated using a different set of tiles by the classifying unit 3010 depending on the signal quality of those respective tiles in each of the colour channels. In this case, the three different resultant signals may be passed by the classifying unit 3010 to the measuring unit 3012 for final measurement of the physiological characteristic of the user.

A number of example methods for production of a resultant signal will now be described with reference to FIGS. 6B to 6D of the present disclosure.

Figure 6B:
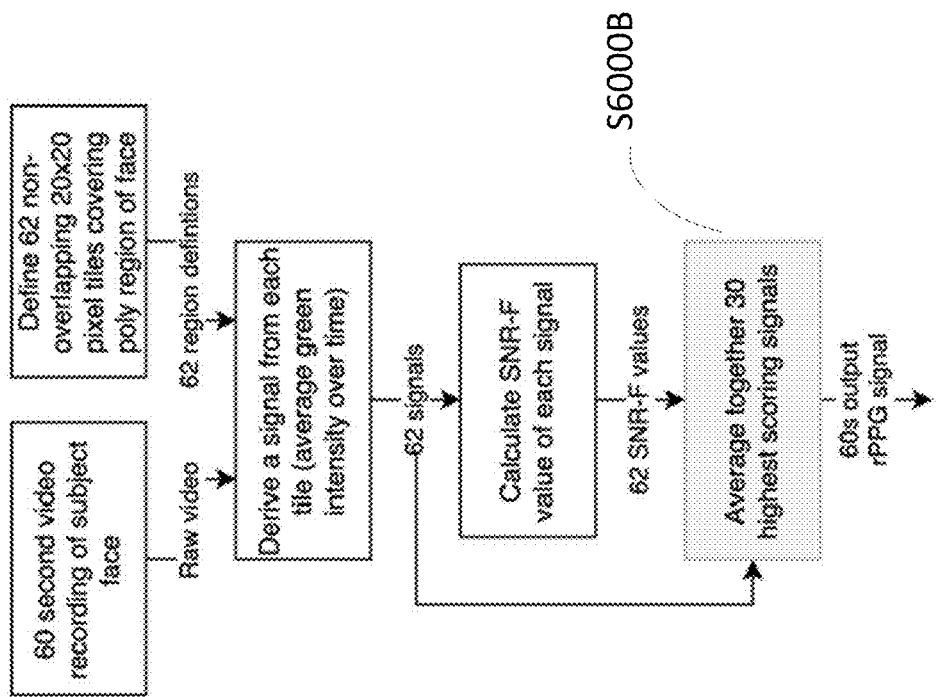
FIG. 6B illustrates an example method for producing a resultant signal in accordance with embodiments of the disclosure.

Turning to FIG. 6B of the present disclosure, an example method of producing a resultant signal in accordance with embodiments of the disclosure. This method may be performed by the classifying unit of apparatus 3000.

In this example, a 60 second video recording of a person is acquired (the video recording including an image of the face of the person). This video recording may be acquired from an image capture device such as image capture device 2002 as described with reference to FIG. 2 of the present disclosure. Then, the partitioning unit of the apparatus 3000 defines a number of non-overlapping tiles covering at least the region of the images covering the face of the person. In this specific example, the partitioning unit defines 62 non-overlapping 20×20 pixel tiles covering the face of the user in the video. However, it will be appreciated that the present disclosure is not particularly limited to this example number of tiles being produced by the partitioning unit.

Then, once the video of the subject has been received and the tiles have been generated, the method comprises deriving a signal from each tile. In this example, the signal is the average intensity in the green colour channel over time (i.e. for a given tile over the series of images). This provides 62 different signal (one for each tile across the series of images of the video recording).

The method then comprises calculating SNR-F values for each signal as a classification score. The SNR-F values may be calculated in the manner described with reference to FIG. 6A of the present disclosure, for example. This provides 62 different SNR-F values (i.e. one for each tile across the series of images of the video recording) which can be used in order to understand the quality of the signal which can be obtained from each of the respective tiles.

Then, the 62 signals and corresponding 62 SNR-F values are then combined in order to produce the aggregate signal. In the example of FIG. 6B of the present disclosure, combining the different tiles comprises averaging together the signals of the 30 highest scoring tiles. Thus, FIG. 6B provides an example of a selection of the best N tiles for production of the resultant signal.

The method of FIG. 6B then ends when the resultant signal is output (the resultant signal being a resultant rPPG signal in this example).

Figure 6C:
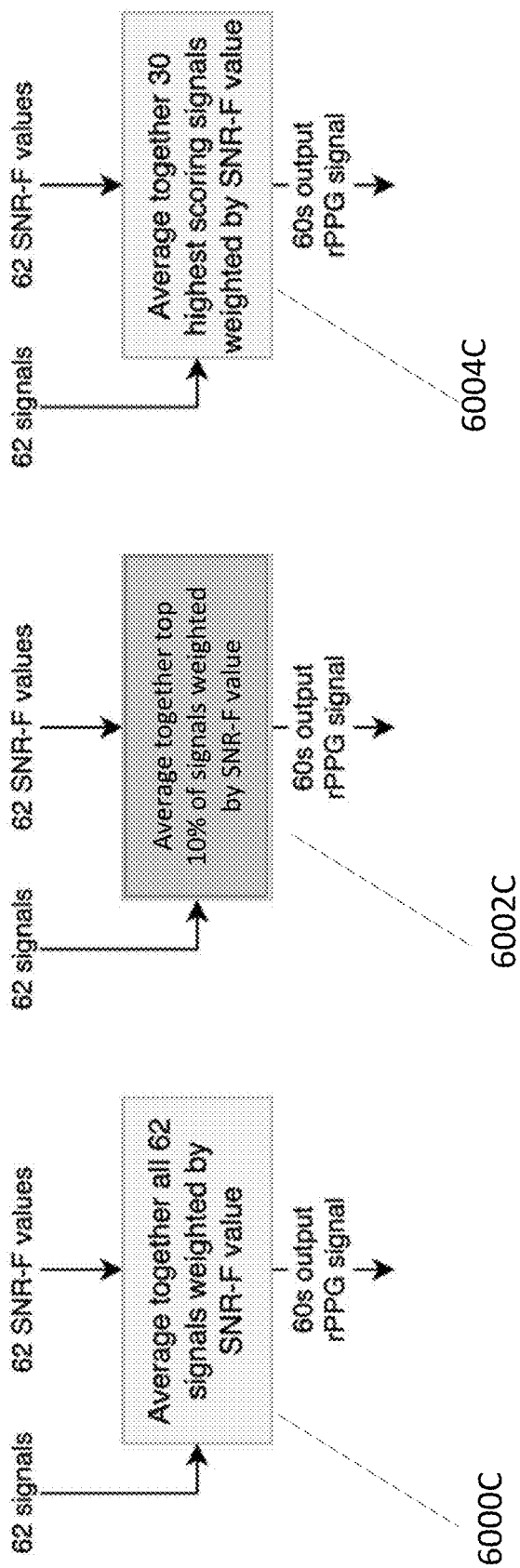
FIG. 6C illustrates an example method for producing a resultant signal in accordance with embodiments of the disclosure.

Turning now to FIG. 6C of the present disclosure, a further example method of producing a resultant signal in accordance with embodiments of the disclosure is illustrated. The example method of FIG. 6C shows a number of alternative method steps which can be used instead of the best N tiles for production of the resultant signal. That is, each of the steps 6000C, 6002C and 6004C can be used as an alternative to step 6000B in FIG. 6B of the present disclosure. The remainder of the method is the same as described with reference to FIG. 6B of the present disclosure; a detailed description of the remainder of the method will therefore not be provided for brevity of the disclosure.

Step 6000C is a first alternative to the step S6000B which can be used with embodiments of the disclosure. In 6000C, all 62 signals (from the 62 tiles) are averaged together in order to create the resultant signal, weighted by their SNR-F value. Thus, 6000C is an example of a method using a weighted average of the tiles in the production of the resultant signal.

Step 6002C is a second alternative to the step 6000B which can be used with embodiments of the disclosure. In 6002C, the tiles corresponding to the strongest 10% of the signals are identified. The signals from this top 10% of the tiles are then averaged together in order to create the resultant signal, weighted by their SNR-F value. Thus, 6002C is an example of a method using the top M % of tiles for production of the resultant signal.

Step 6004C is a third alternative to the step 6000B which can be used with embodiments of the disclosure. In 6004C, the tiles corresponding to the 30 highest scoring signals are identified. Then, these signals are combined by computing a weighted average of the tiles (with the tiles being weighted by SNR-F value). In other words, in contrast to 6000B (in which the average of the top 30 tiles is computed) step 6004C requires that the resultant signal is produced by taking a weighted average of the top 30 signals. Thus, each of the top 30 signals contributes to the resultant signal in accordance with its own signal strength; weaker signals (with a lower SNR-F value) will have a weaker contribution to the resultant signal.

Now, while the above described methods have been described for combining tiles across the entire image series (full signal period) the present disclosure is not particularly limited in this regard. In other examples, a segmented-in-time approach can be used which further separates each tile into several time sections, giving individual tiles multiple scores corresponding to each time section across the image series. This can then be combined with the above-described aggregation methods within each time section. A weighting, best N, best M % or a combined approach can then be used within each time section to create the best aggregated signal for that time section. The resulting signals from each segment can be combined in order to create a full aggregation across the entire image series (i.e. to create a resultant signal for the full signal period).

As an example, consider a series of images lasting 60 seconds which has been captured by an image capture device such as image capture device 2002 and acquired by acquiring unit 3002 of apparatus 3000. The partitioning unit 3004 of apparatus 3000 may partition the images of this series of images into 100 individual tiles. However, these tiles can be split into six different time-segments of 10 seconds each. For the first 10 second segment, the best 20 tiles may be identified by the classification unit 3008 (e.g. using the signal quality indicator produced by the determining unit 3006). These best 20 tiles may then be aggregated together in order to generate the resultant signal for the first 10 second segment of the series of images. For the next 10 seconds, the best 20 tiles may then be re-evaluated and may in fact be a completely different selection of tiles than for the first 10 second segment of the series of images. This may occur due to a change in the external environment during image capture and/or a movement of the subject, for example. These best 20 tiles for the second 10 second segment of the series of images may then be aggregated together in order to generate the resultant signal for the second 10 second segment of the series of images. Once the aggregated signals are retrieved for each time segment, the time segments can then be combined in order to produce the resultant signal for the full 60 second output signal.

Accordingly, in some embodiments of the disclosure, apparatus 3000 may separate the images of the series of images into a number of time segments; and perform the method of the present disclosure for each time segment of the series of images.

As an example, a 60 second video may be split into, six segments of 10 seconds and the 'best N' tiles (in terms of SNR-F score) identified and aggregated for each segment. Thus, different tiles may be selected for each 10 second segment. The aggregated signals retrieved for the segments may then be recombined into a full 60 second output signal (described in more detail with reference to FIG. 6E of the present disclosure).

Figure 6D:
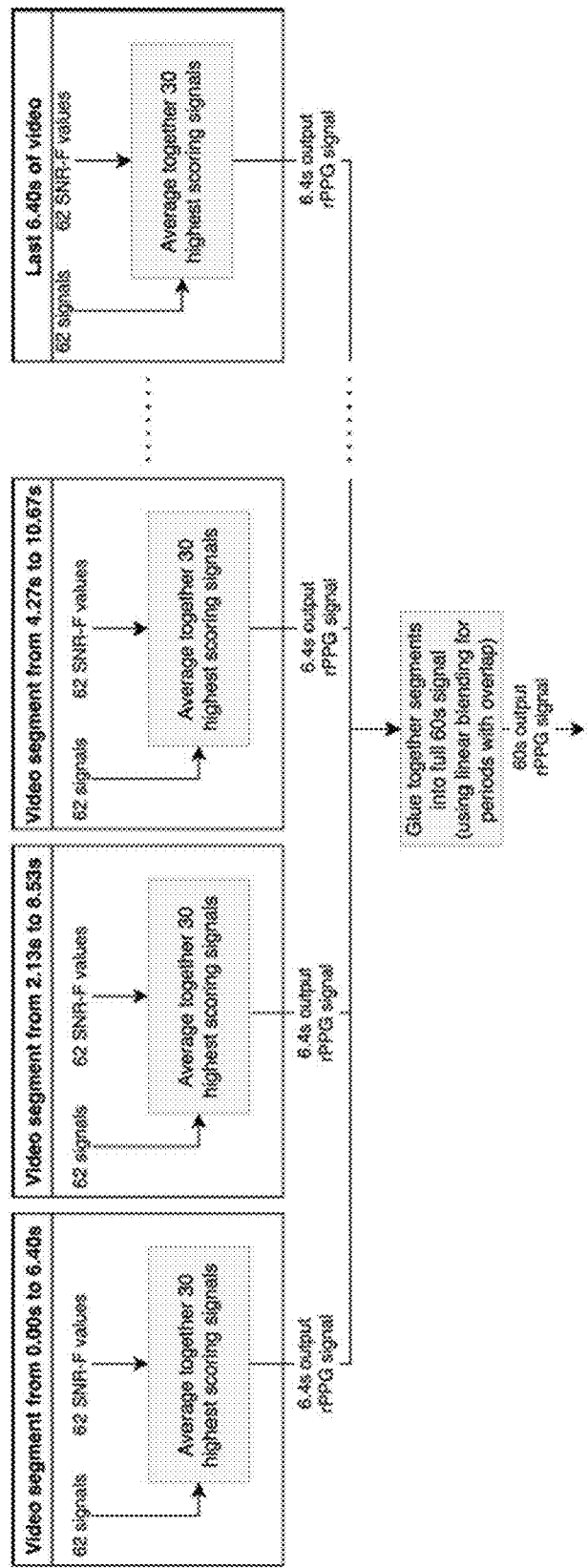
FIG. 6D illustrates an example method for producing a resultant signal in accordance with embodiments of the disclosure.

Consider now FIG. 6D of the present disclosure. FIG. 6D illustrates an example method of producing a resultant signal in accordance with embodiments of the disclosure. However, the example of FIG. 6D of the present disclosure differs from the examples of FIGS. 6B and 6C of the present disclosure in that the image tiles of the example of FIG. 6D of the present disclosure are segmented in time.

In the example of FIG. 6D of the present disclosure, the video which has been received from the image capture device 2002 is segmented into a number of different segments in time. The first of these segments is from 0.00 s to 6.40 s. The second of these segments starts at 2.13 s into the video sequence and extends to 8.53 s. Thus, the second video segment overlaps with the first video segment. The third video sequence extends from 4.27 s to 10.67 s. Thus, the third video segment overlaps with each of the first and second video segments. This same process is repeated for the video segments until the Nth video segment which comprises the final 6.40 s of the video.

The method of FIG. 6B is then applied to each of these video segments individually. That is, each video segment is individually partitioned into tiles. Indeed, the tiles may be different across each of the image segments. Then, for each individual segment, the SNR-F values are determined for each tile within that segment. Once the SNR-F values have been determined, the individual tiles are then aggregated for each video segment in order to generate a resultant signal for each of the video segments. This part of the method is illustrated in FIG. 6D of the present disclosure, where the individual tiles of the each segment are averaged together to generate a 6.4 s resultant signal for the that video segment.

Once the resultant signals have been generated individually for each segment of the video, these segments are then combined in order to generate a resultant signal for the full video sequence. In this example of FIG. 6D of the present disclosure, the signals from the different segments of the video sequence are combined by stitching the different segments of the video together. However, the present disclosure is not particularly limited in this regard and any suitable method of combining the signal from the overlapping image segments can be used.

This segmented-in-time approach may be particularly advantageous when there is significant movement of the subject and/or changes in the external environment during the period of image capture by the image capture device. This is because segmenting the tiles in time enables a dynamic selection of the tiles in response to movement of the subject and/or changes in the external environment during the image capture, which maximizes the information obtained from the series of images. Accordingly, the physiological parameters of the user can be determined with even higher accuracy and reliability in these situations. Moreover, the length of each time segment may be adapted or controlled depending on the rate of change of position of the subject and/or rate of change in the external environment. In this way, a flexible approach can be provided which ensures that the most relevant tiles in the image are used to produce the resultant signal at any given stage of the image capture process.

Notably, when the segmented-in-time approach is used, the configuration of tiles (e.g. shape, size or number of the tiles) may remain the same across all the images in the series of images. The classifying unit 3010 then selects a different selection of these tiles for each time segment of the series of images when producing the resultant signal. However, in some examples, if apparatus 3000 is configured such that the classifying unit 3010 will use a segmented-in-time approach, the partitioning unit 3004 of apparatus 3000 may also be configured such that a different configuration of tiles may be used for each time segment of the series of images. That is, while the tiles remain the same over each time segment, they may change in configuration (e.g. shape, size, or number) between time segments of the series of images. By changing the tile configuration between time segments of the series of images in this way, the flexibility of the apparatus 3000 to changes in the external environment and/or can be further improved. Accordingly, the physiological parameters of the user can be determined with even higher accuracy and reliability in these situations.

Figure 6E:
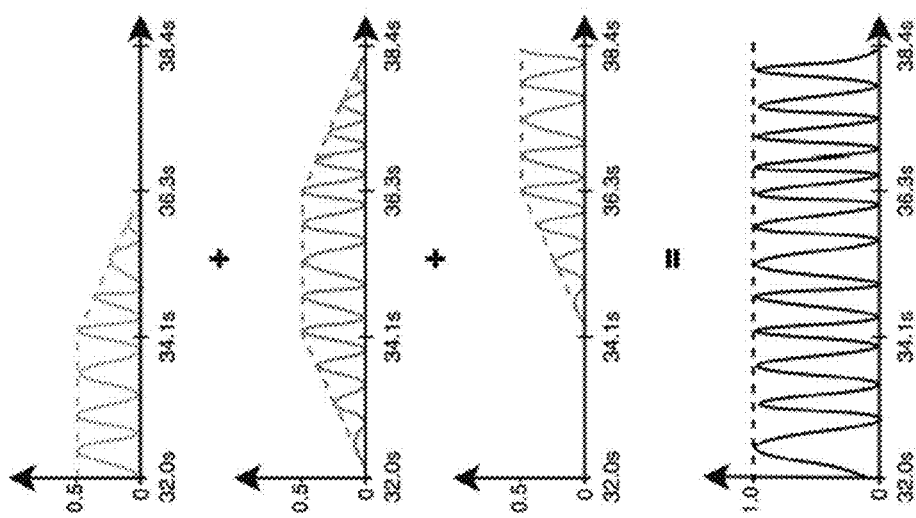
FIG. 6E illustrates an example resultant signal in accordance with embodiments of the disclosure.

FIG. 6E illustrates an example resultant signal in accordance with embodiments of the disclosure. Specifically, FIG. 6E shows a way in which the resultant signals of different time segments of a video sequence can be combined in order to produce a resultant signal for the entire video sequence.

The top panel of FIG. 6E illustrates the resultant signal from a first video segment. This video segment covers a region of the video from 32 s to 36.3 s.

The second panel of FIG. 6E illustrates the resultant signal from a second video segment. This video segment covers a region of the video from 32 s to 38.4 s. It therefore overlaps with the first video segment shown in the top panel of FIG. 6E.

The third panel of FIG. 6E illustrates the resultant signal from a third video segment. This third video segment and covers a region from 34.1 s to 38.4 s (the end of the video in this specific example). The third video segment shown in FIG. 6E of the present disclosure thus overlaps with each of the first and second video segments.

In the example of FIG. 6E of the present disclosure, a linear fade is applied to each of the individual video segments in order to attenuate the video segment for the region of the video segment which overlaps with the adjacent video segments. Here, as there is a ⅔ segment overlap between the video segments of the example of FIG. 6E, the first and final third of the second video segment (which overlaps with both the first and third video segment) is attenuated with the linear fade.

Once the linear fade has been applied to the resultant signals of each video segment, the individual resultant signals can be summed to produce a resultant signal which covers the entire video sequence (the bottom panel of FIG. 6E).

Indeed, since the segments are overlapping in time and a linear fade is applied to the region of overlaps between segments, a smooth transition between the individual image segments can be achieved.

However, it will be appreciated that the present disclosure is not particularly limited to this specific way of combining resultant signals for individual segments.

Figure 6F:
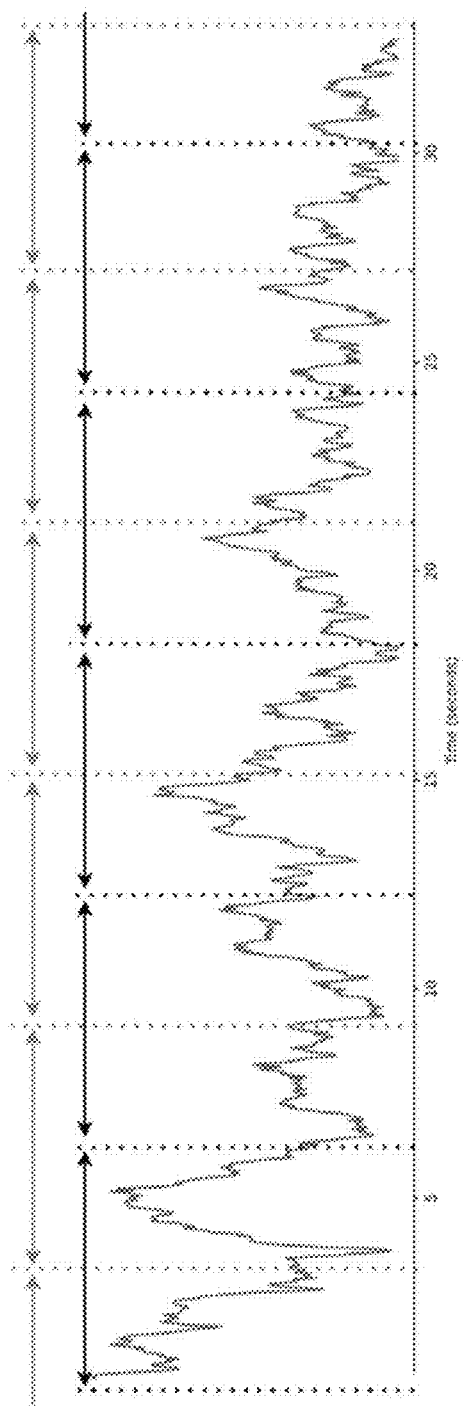
FIG. 6F illustrates an example resultant signal in accordance with embodiments of the disclosure.

Turning now to FIG. 6F of the present disclosure, an example resultant signal in accordance with embodiments of the disclosure is illustrated. The plurality of different overlapping segments which have been used in order to generate the resultant signal are shown. It will be appreciated that these overlapping segments are only one example of the types of overlapping segments that can be used in accordance with embodiments of the disclosure. That is, the individual segments could be longer or shorter than the segments shown in this example. Moreover, the amount of overlap between the segments could be much more or much less than that shown in this example. Nevertheless, it will be appreciated that by using a plurality of overlapping segments in this manner, transition between the segments can be more accurately performed.

However, in some examples. The individual segments may be stored as a plurality of independent resultant signals. Each of these independent resultant signals could then be used in further processing to measure the physiological characteristics of a person. This may improve the flexibility of processing. Moreover, if one or more of the segments of the video sequence had low signal quality (e.g. corresponding to a time when the person momentarily moved out of the view of the image capture device) then said segment could be removed and measurement of the physiological characteristic of the person could be performed on the remaining segments of the video sequence.

Furthermore, in some examples, it may be advantageous to introduce a programmable delay to each tile prior to combination with the signals from other tiles (which may also have their own unique time delays). Hence, in some examples, the apparatus 3000 may be configured to apply a time delay to one or more of the plurality of image regions with respect to the other image regions of the plurality of image regions before determining the signal quality indicator of each of the plurality of image regions for the series of images.

This time delay may be introduced in order to compensate for propagation delays to the pulse as it passes through different regions of the face. That is, the peak of the pulse in a first region of the face may occur at a slightly different time than the peak of the same pulse in a second, different, region of the face. This is because of the small time delay in the pulse (from the beat of the heart) propagating through the face of the person. The delay for different tiles (corresponding to different regions of the face) may be determined in advance. This may be determined, for example, from a test or calibration performed on a number of individuals. The time delay may also be determined based on one or more physiological characteristics of the human body. Introduction of a time delay for different tiles in this manner may thus compensate for propagation delays to the pulse through different regions of the face such that the signals from different tiles can be aligned. Temporal alignment of the signals in this manner (with the introduction of the propagation delay) may further maximise the signal to noise ratio which can be determined. This is because it ensures that the pulse signal from all the tiles included in the calculation have been aligned. The use of the individual time delay for different tiles can be used in combination with any of the different tile combination and aggregation methods which have been described.

In this way, the classifying unit 3010 of apparatus 3000 classifies the plurality of image regions (tiles) in accordance with the signal quality indicator which has been determined and thus produces a resultant signal from the series of images for use in measurement of the physiological parameter of the user.

<Measuring Unit 3012>

As explained with reference to FIG. 3 of the present disclosure, apparatus 3000 further comprises a measuring unit 3012. The measuring unit 3012 is configured to perform a measurement of a physiological parameter of the person using one or more of the plurality of image regions based on a result of the classification.

More specifically, in some examples, the measuring unit 3012 is configured to acquire the result of the classification performed by the classifying unit 3010 of apparatus 3000 (such as the resultant signal for the full series of images) and perform the measurement of the physiological characteristic of the person using this result.

Figure 6G:
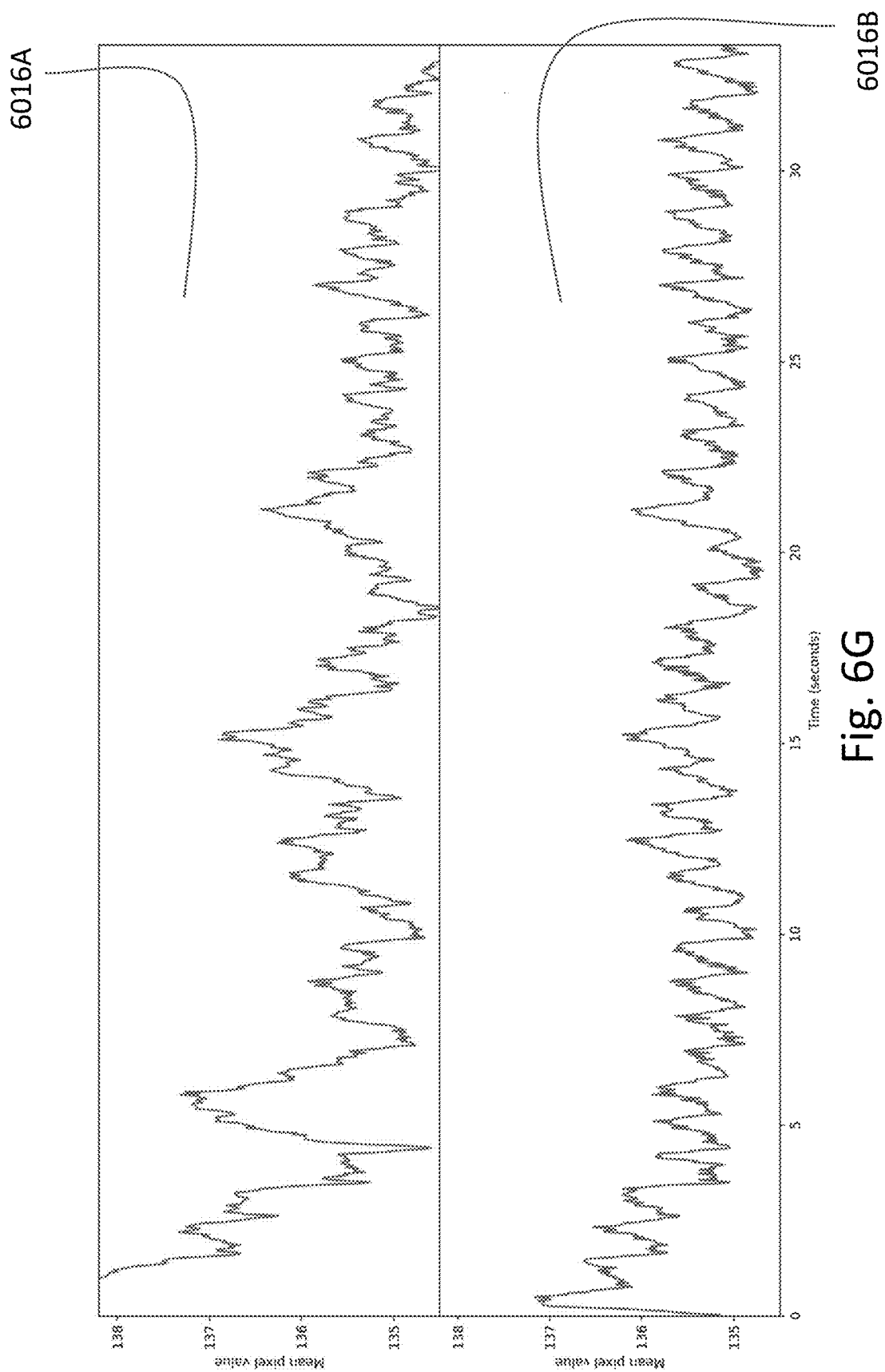
FIG. 6G illustrates an example signal in accordance with embodiments of the disclosure.

Consider FIG. 6G of the present disclosure. FIG. 6G of the present disclosure illustrates an example signal in accordance with embodiments of the disclosure. This may be a resultant signal as produced by the classifying unit 3010 of apparatus 3000 (in a single colour channel).

In fact, there are two different example signals illustrated in FIG. 6G The first (shown in panel 6016A) is a signal which may be obtained without tiling (i.e. without partitioning the image into a plurality of image regions). That is, the signal shown in panel 6016A of FIG. 6G is a comparative example of a type of signal which may be obtained when signal extraction is performed directly on the images (such as by calculating the average colour intensity over time in a course region of the face).

In contrast, the example signal illustrated in panel 6016B of FIG. 6G is an example signal as may be obtained in accordance with embodiments of the disclosure from the same region (i.e. by partitioning the images into a plurality of image regions). In the specific example of panel 6016B of FIG. 6G, the partitioning unit generated 62 tiles of size 20×20 pixels located around the image. These tiles were then scored using SNR-F and the signals from the best 30 tiles were averaged together.

The green colour channel was used for both the signal in panel 6016A and 6016B.

The signal extracted using tiling (panel 6016B of FIG. 6G) shows a more consistent pulse pattern (distance between peaks) than the signal extracted without tiling (panel 6016A of FIG. 6G). Thus, the signal extracted using tiling provides a cleaner signal from which more accurate and reliable measurements of the physiological parameter of the person can be made.

That is, since the resultant signal of panel 6016B has been produced from an aggregation of tiles across the series of images based on the signal quality of each of those tiles, apparatus 3000 is able to extract a stronger and cleaner signal from the images which have been acquired. The resultant signal (as shown in panel 6016B of FIG. 6G of the present disclosure) is impacted less by factors such as the movement of the person, changes in lighting, face wear (such as the glasses described with reference to FIGS. 5A and 5B) and the like than the signal illustrated in panel 6016A of FIG. 6G. Moreover, the resultant signal is a stronger signal than could be obtained from any given individual tile within the images.

In accordance with embodiments of the disclosure, measurement unit 3010 of apparatus 3000 is configured to perform a measurement of a physiological parameter of the person using the one or more of the plurality of images regions based on a result of the classification of the classifying unit 3010 using this resultant signal.

As explained, a person's skin changes colour slightly in accordance with the beating of their heart. Therefore, variation in skin colour when the heart beats can be used in order to detect the heart rate of a person. Colour changes within the face of the individual provide the best results for detecting the heart rate of the individual. The colour change of the face of the individual can therefore be used in remote photoplethysmography in order to measure the physiological parameter of the user. That is, the resultant signal produced by the classifying unit 3010 (showing the variation of the colour over time) can be used by the measuring unit 3012 in order to measure the heart rate or pulse of the individual. This is explained in WO2013/027027 and so will not be described in any further detail for brevity of disclosure. Additionally, colour changes within the face can be used to derive other physiological parameters including vital signs, such as breathing rate and Heart-Rate Variation (HRV).

In some examples of the disclosure, performing a measurement of the physiological parameter of the person comprises: performing a periodogram on at least one of a red, green and blue channel of the one or more of the plurality of image regions based on a result of the classification; and determining the physiological parameter based on the periodogram.

Details regarding mechanisms for measurement of physiological parameters of the user from a signal such as that illustrated in panel 6016B of FIG. 6G of the present disclosure are explained in WO 2019/008322 and will not be described in any further detail for brevity of the disclosure.

Figure 6H:
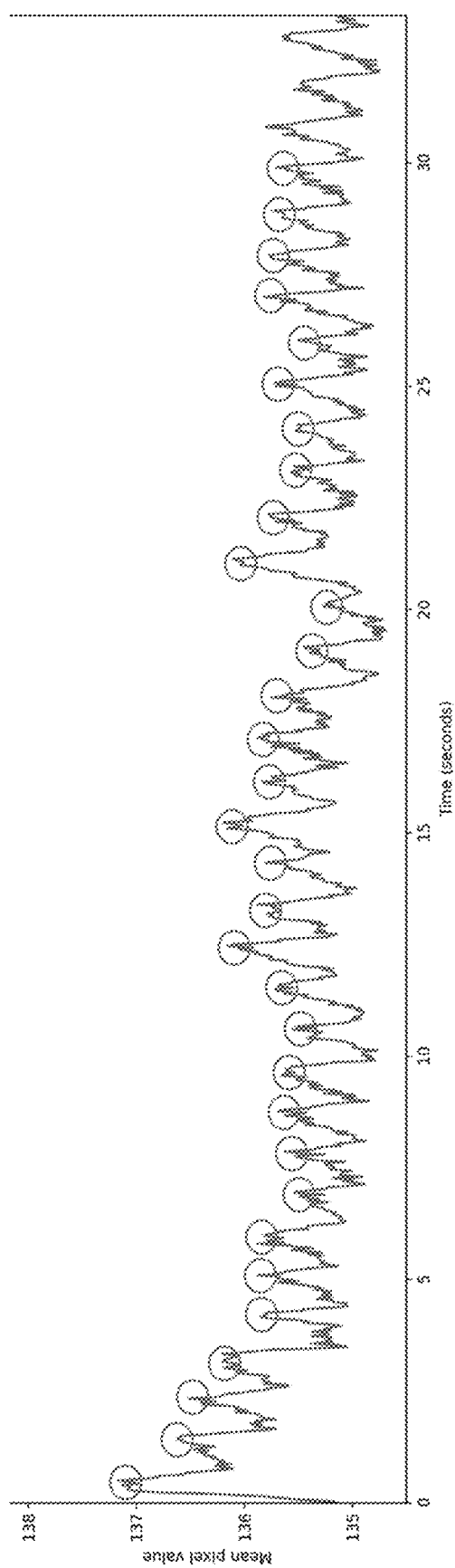
FIG. 6H illustrates an example derivation of a vital sign in accordance with embodiments of the disclosure.

FIG. 6H illustrates an example derivation of a vital sign in accordance with embodiments of the disclosure.

In this example, a resultant signal (similar to that described with reference to FIG. 6G of the present disclosure) is shown. This resultant signal can then be used in order to derive a vital sign of the person. In this specific example, the vital sign is the heart rate of the person. However, it will be appreciated that the present disclosure is not particularly limited to this example, and other vital signs or physiological parameters may be derived from the signal including breathing rate and Hear-Rate Variation, for example.

In this example, in order to determine the heart rate of the person, the number of peaks in a period of time must be counted. In this example, the period of time is the period of time from 0 seconds to 30 seconds.

Any suitable signal processing technique known in the art may be used in order to identify the number of peaks. Here, in this example, each peak of the signal in the time period of 0 to 30 seconds has been identified with a circle.

Once the peaks have been identified, they can be counted. In this example, there are 32 peaks of the signal in the period of 0 to 30 seconds.

Then, the heart rate of the person (in beats per minute) can be calculated by subtracting 1 from the number of peaks which have been counted and multiplying this number by 2. This gives 62 beats per minute in this specific example.

Therefore, the resultant signal can be used in order to measure a physiological parameter of the person (the heart rate of the person in this specific example). Of course, it will be appreciated that the present disclosure is not particularly limited to this specific example described with reference to FIG. 6H.

In this way, the measuring unit 3012 performs measurement of the physiological characteristic of the person from the result of the classifying unit 3010.

<Advantageous Technical Effects>

In accordance with embodiments of the disclosure, a signal quality of remote photoplethysmography (PPG or rPPG) can be improved which improves the accuracy and reliability of measurement of a physiological parameter of a person. Moreover, according to embodiments of the disclosure the impact of disturbances during the measurement of the physiological parameter of a person (such as movement, light fluctuations, ballistocardiographic signals or the like) can be minimised.

This is because apparatus 3000 utilizes an adaptive mechanism whereby the images acquired by acquiring unit 3002 are partitioned into a series of tiles and where at least a portion of these tiles are then selected (based on their signal quality) for aggregation to construct a resultant signal. The best tiles (image regions) with the strongest signal quality from the images which have been acquired are therefore used in the measurement of the physiological characteristics of the user. This adaptive approach improves the accuracy with which the physiological characteristics of the user can be measured and reduces the influence of disturbances during the measurement process.

Rather than predefining a specific area of the face embodiments of the disclosure provide for dynamic selection of tiles, thus ensuring that the best signal is used for each subject. Embodiments of the disclosure also improve the quality of the rPPG signals from individuals with darker skin tones and overcome issues such as uneven light distribution, variation in the position and orientation of the face relative to the camera and issues caused by movement of the subject during measurement.

Of course, it will be appreciated that the present disclosure is not particularly limited to these advantageous technical effects. Other effects will become apparent to the skilled person when reading the disclosure.

<Alternative Configurations>

While embodiments of the disclosure have been described with reference to the example configuration of the apparatus 3000 illustrated in FIG. 3 of the present disclosure, it will be appreciated that the present disclosure is not particularly limited in this regard.

As an alternative example, it will be understood that certain functions (such as acquisition of the images) may be performed on a client device. Then, once the images have been obtained, these images may be transmitted over a network connection (such as the internet) to a server. The server may then perform one or more of the other functions (such as partitioning the images, computing the colour values, determining the signal quality and classing the image regions). The server may then return the resultant signal (as produced by the classifying unit 3010) to the client device for measurement of the physiological parameter of the person.

In this way, functions which are more computationally intensive can be performed by a server on a sever side of a network, reducing the computational burden on the client device.

Of course, it will be appreciated that the distribution of processing tasks between the client device and the server are not limited to this example. In other examples, the client device may perform the steps of acquisition of the images, partitioning of the images and computation of the resultant image regions. Moreover, it will be appreciated that embodiments of the disclosure may implement an adaptive technique whereby different tasks are performed by the client device or the serve depending on load conditions of the network and the availability of computational resources. This flexible approach ensures efficient use of resources.

Furthermore, in some examples, apparatus 3000 of the present disclosure (as described with reference to FIG. 3) may be located entirely on the server side of a network. Then, a client device (such as a portable electronic device (e.g. a mobile telephone device, a tablet computing device, a laptop computing device or the like)) can be used in order to capture a series of images of a person, each image of the series of images of the person including at least a skin exposed region of the person. The client device may then transmit the series of images to apparatus 3000 (located on the server side of the network) and receive from apparatus 3000 a measurement of one or more physiological parameters of the person. This system provides a particularly computationally efficient way of obtaining a measurement of a physiological parameter of the person on the client side of the network.

<Example Implementation>

Figure 7:
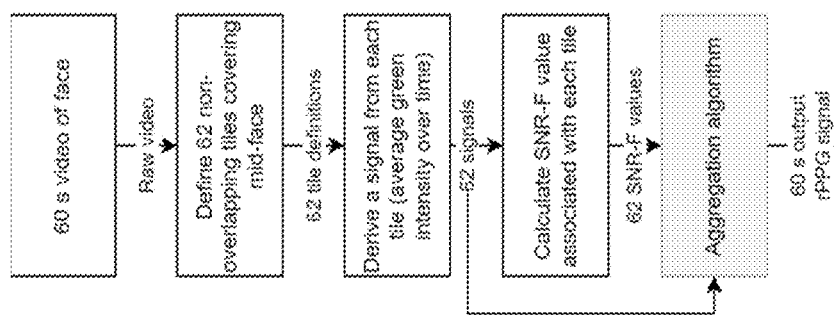
FIG. 7 illustrates an example implementation of embodiments of the disclosure.

FIG. 7 of the present disclosure illustrates an example implementation of embodiments of the disclosure. In this example, a resultant rPPG signal is produced using a number of tiles which have been dynamically selected from a video sequence of the user's face.

The example of FIG. 7 starts when a 60 second video of the face of the person is captured. This video may be captured and recorded using an apparatus such as apparatus 1000 described with reference to FIG. 1 of the present disclosure. More specifically, the video may be captured and recorded by a portable electronic device of the user.

In this example implementation, the video is recorded at 1280×720 pixels and 30 frames per second using a H-264 minimal compression algorithm. However, any suitable resolution and frame rate may be used to record the video in accordance with embodiments of the disclosure.

Once the video has been captured, each frame of the video is then partitioned into 62 non-overlapping tiles covering the mid-face of the user. The mid-face of the user (an example of a region of interest) includes the cheeks, nose and top of the lip of the user in the images.

Once the tiles have been defined, a signal is then derived from each tile (the signal being the average green intensity over time).

Then, the signal quality of each tile is determined from the SNR ratio in the frequency domain (SNR-F) of the green channel, which gives the highest SNR due to absorbance from haemoglobin and oxyhaemoglobin (compared with the blue and red channels). The signal power at the pulse frequency (±0.15 Hz) may then be compared with the signal power in the remainder of the 0.5-5 Hz band. Accordingly, the SNR-F value associated with each tile is calculated and can be used as the signal quality indicator for each tile.

Optimal tiles are then aggregated in order to produce 60 seconds output rPPG signal (resultant signal) in accordance with the SFR-F value which has been calculated for each tile. Several different tile aggregation methods can be used as described in accordance with the present disclosure. However, in this example implementation, the best N tiles, weighted by the tile's SNR-F score, are averaged into one signal (the resultant rPPG signal). Indeed, in this specific implementation, the best 30 tiles are selected and averaged to generate the output rPPG signal.

The output rPPG signal which is produced can then be used in order to measure one or more physiological parameters of the person.

<Performance Assessment>

A study was performed in order to assess the performance of the process of tiling and aggregation of embodiments of the present disclosure.

Video recordings for this study were made during an ongoing prospective observational study (VISION-MD; NCT04763746), which is developing and evaluating Lifelight for the measurement of VS, compared with current standard of care (SOC) methods (Wiffen L, Brown T, Brogaard Maczka A, Kapoor M, Pearce L, Chauhan M, et al. The VISION-MD (Measurement of Vital Signs by Lifelight® Software in Comparison to the Standard of Care) observational study: protocol. JMIR Res Protoc; 2022).

Videos were recorded at 1280×720 pixels and 30 frames per second using a H-264 minimal compression algorithm.

Signal quality was assessed by an observer (CP) trained to identify the key characteristics of the pulse waveform morphology that are important for retrieval of physiological information.

Figure 8:
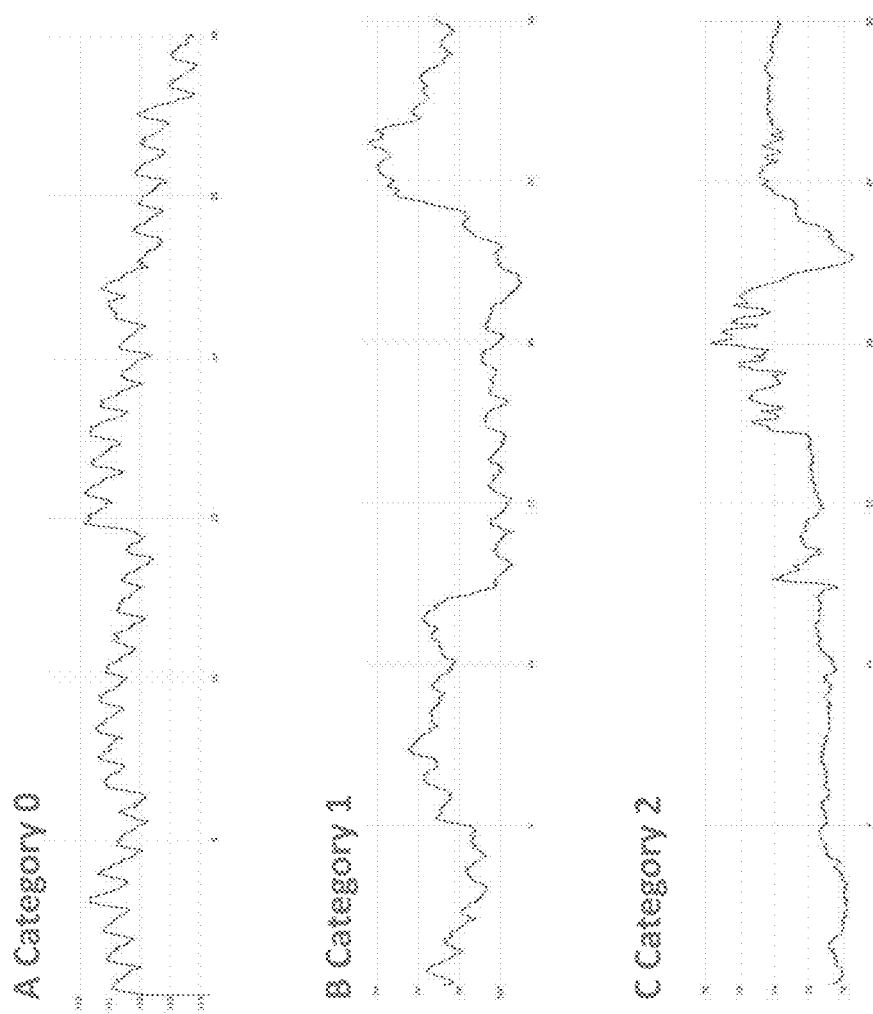
FIG. 8 illustrates examples of signals in each observer assessment category in accordance with embodiments of the disclosure.

The observer analysed the green light channel signal from the mid-face for the full 60 second recording and assigned each signal into one of three quality categories (0, 1 and 2, defined in Error! Reference source not found.). Example signals are shown in FIG. 8. Specifically, FIG. 8 illustrates examples of signals in each observer assessment category in accordance with embodiments of the disclosure.

Raw signals in which the troughs and crests of every pulse wave were evident, with consistent amplitude and wavelength, were designated as 'good' signals (category 0). These signals often had a high signal to noise ratio (SNR) and were used for model training. For signals that did not have a regular pulse wave formation, the observer determined whether the pulse decoding plot had picked up a constant frequency throughout; such signals were classified as category 1. Signals that did not have clear pulse waves were designated category 2.

The observer was blinded to the prior signal processing (i.e. standard mid-face analysis or tiling and aggregation (T&A) analysis of the present disclosure).

TABLE 1

Categories used by the observer in the signal quality assessment

| Category | Quality | Description | Potential use |
|---|---|---|---|
| 0 | High | Clear and consistent waveform throughout | Suitable for algorithm training and development |
| 1 | Medium | Pulse visible for most of the signal but irregular | Suitable for algorithm testing |
| 2 | Poor | Irregular raw signal and no detectable pulse, or pulse obscured by non-physiological noise, baseline level shifts caused by artifacts of the rPPG light-dependent signal | Not suitable for development or testing without further processing |

In each video frame, the mid-face area was divided into a 62 tiles, each measuring of 20×20 pixels, with no gaps or overlap. Average green light values were determined for all the tiles in each frame and the signal quality calculated for each tile (SNR-F was calculated as the signal quality in this example). The output signal was then derived based on the 'best' file signals (i.e. highest signal quality) using different aggregation algorithms. Several different methods for aggregating the signals from multiple tiles were tested (see Table 2).

TABLE 2

Methods used for tile aggregation

| | |
|---|---|
| All tiles weighted | Takes all tile signals (weighted by each tile's SNR-F score) and determines a weighted average |
| Best N tiles | Only the 'best' N tiles (tiles with the highest SNR-F score) are averaged into one signal (e.g. always taking the top 30 scoring tiles) |
| Best N tiles weighted | The best N tiles, weighted by the tile's SNR-F score, are averaged into one signal |
| Best N tiles segmented* | Videos are cut into time-discrete segments; the tiles for each time segment are scored and the best N tiles for that segment are combined; multiple time segments may be combined or overlapped to smooth the signal and avoid sharp discontinuities at the boundaries of segments |
| Best N tiles segmented and weighted | A combination of the Best N tiles weighted and Best N tiles segmented algorithms |

In segmentation algorithms, a 60 second video is split into, for example, six segments of 10 seconds and the 'best N' tiles (in terms of SNR-F score) identified and aggregated for each segment. Thus, different tiles may be selected for each 10 second segment. The aggregated signals retrieved for the segments are then recombined into a full 60 second output signal.

To assess the performance of the tiling and aggregation (T&A) of embodiments of the disclosure, boundaries for the observer categories defined in Error! Reference source not found. (i.e. categories 0-2) were determined based on SNR-F scores. Thus, the SNR-F scores for all signals in one category were calculated and the mean (μ) and standard deviation (σ) determined. Boundaries between categories 2 and 1 (b2,1) and between categories 1 and 0 (b1,0) were estimated as follows:

$$b_{2,1} = \mu_2 + \left(\frac{\mu_1 - \mu_2}{\sigma_1 + \sigma_2}\right)\sigma_2 \quad (3)$$

$$b_{1,0} = \mu_1 + \left(\frac{\mu_0 - \mu_1}{\sigma_0 + \sigma_1}\right)\sigma_1 \quad (4)$$

where $\mu_i$ and $\sigma_i$ are the mean and standard deviation of the SNR-F scores for the signals in category i. A signal with an SNR-F score <b2,1 would be predicted as category 2; SNR-F≤b2,1 and <b1,0 would be predicted as category 1, and SNR-F≥b1,0 in category 0.

SNR-F scores for the mid-face analysis and following T&A were compared using quiver plots to determine whether the signal quality had improved sufficiently to justify promotion to a higher category (i.e. from 1 to 0, or from 2 to 1 or 0). The quality categories assigned based on SNR-F scores were compared with the categories assigned by the observer.

In a secondary analysis, a set of signals that would be predicted to be promoted into a higher observer category following T&A based on SNR-F scores were identified and compared with the actual observer-assigned categories. Only signals with SNR-F scores at least 2 dB from the category boundaries (whether based on the mid-face or following T&A) were selected. This criterion minimised uncertainty about the estimated category, as 2 dB was approximately 20% of the distance between category boundaries.

Observer ratings and SNR-F scores were also compared before and after T&A (using embodiments of the disclosure) for Fitzpatrick skin types 5 and 6 to assess the effect of skin tone.

<Results>

A total of 4310 high-resolution videos were recorded from 1315 participants as part of the VISION-MD study.

<Signal Quality>

Figure 9:
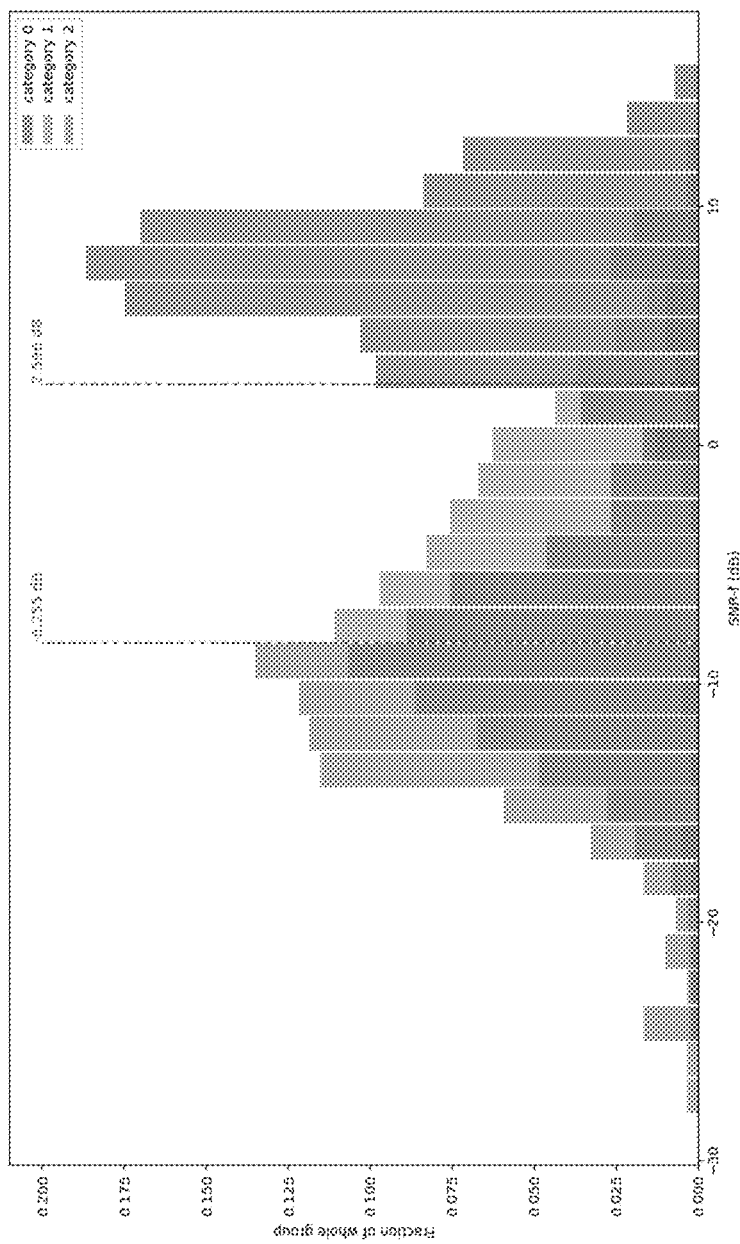
FIG. 9 illustrates the distribution of signal quality index in accordance with embodiments of the disclosure.

FIG. 9 illustrates the distribution of signal quality index in accordance with embodiments of the disclosure. That is, FIG. 9 shows the distribution of SNR-F scores for the three observer categories based on analysis of the mid-face region (i.e. without T&A). Note that there is some overlap in SNR-F scores between categories, because the assignments are based on the characteristics of the pulse whereas SNR-F scores are a single value. Overall, signals with lower SNR-F scores fell largely within the poor-quality category (category 2), whilst those with higher SNR-F scores fell into category 0 (highest quality). Estimated boundaries between the categories based on SNR-F scores, are also shown in FIG. 9; it is evident that signals with SNR-F scores >2.596 dB were the most likely to fall into category 0.

<Effect of Tiling on Signal Quality>

Figure 10:
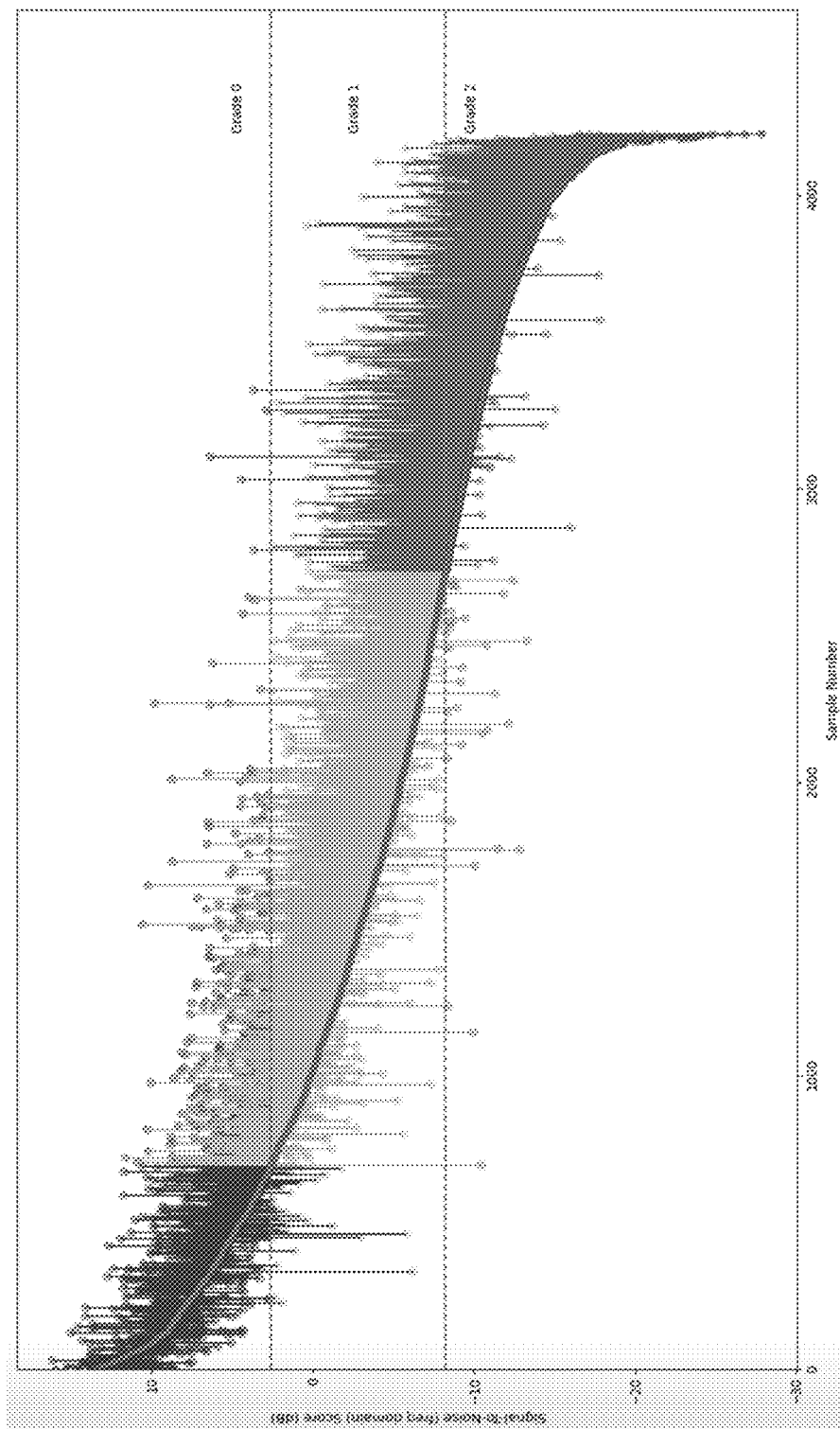
FIG. 10 illustrates a quiver plot comparing SNR-F signals before and after tiling and aggregation in accordance with embodiments of the disclosure.
Figure 11:
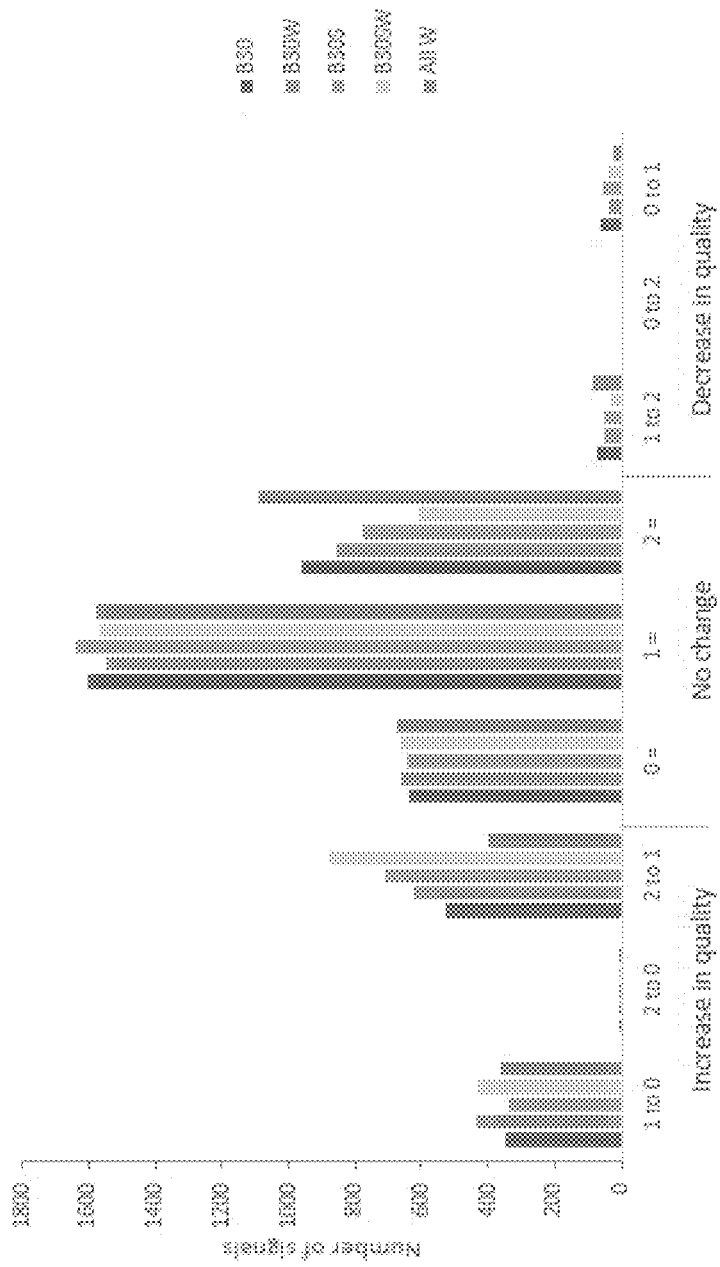
FIG. 11 illustrates changes in signal quality category following tiling and aggregation in accordance with embodiments of the disclosure.

The SNR-F scores from the mid-face analysis were compared with those following T&A for each video using quiver plots, as illustrated in FIG. 10. Specifically, FIG. 10 illustrates a quiver plot comparing SNR-F signals before and after tiling and aggregation in accordance with embodiments of the disclosure. T&A improved the mean SNR-F (Table 3) and 87-95% of signals improved by at least one category, with 31-41% improving into category 0 (FIG. 11 of the present disclosure). That is, FIG. 11 illustrates changes in signal quality category following tiling and aggregation in accordance with embodiments of the disclosure. Importantly, 29-57% of signals improved from category 2 (not usable) into category 1. Improvements were seen with all the algorithms tested (Table 2). A small number of signals were assigned into a lower-quality category following T&A: 3-6% moving from category 0 to 1 and 3-10% moving from category 1 to 2.

TABLE 1

Performance of the tiling and aggregation algorithms compared with the standard no tiling analysis (n = 4212 samples) based on signal to noise ratio in the frequency domain

| Algorithm | Mean | SD | Lowest | Highest |
|---|---|---|---|---|
| No tiling | −4.88 | 6.99 | −27.85 | 15.93 |
| Best 30 tiles | −2.99 | 6.87 | −25.21 | 16.49 |
| Best 30 tiles weighted | −2.37 | 6.92 | −22.36 | 16.67 |
| Best 30 tiles in segments | −2.60 | 6.42 | −23.89 | 16.02 |
| Best 30 tiles in segments weighted | −1.86 | 6.28 | −21.25 | 16.12 |
| All tiles weighted | −3.21 | 7.44 | −27.11 | 16.28 |

In the secondary analysis, 52 signals were identified that were predicted to change observer category based on comparison of the SNR-F scores before and after T&A. Most of these signals (32/52; 62%) showed the predicted recategorization following T&A. The segmented weighted algorithm appeared least reliable in predicting observer recategorization (33%) whereas the other algorithms performed similarly (64-100%). Category reassigment in the secondary analysis is illustrated in Table 4 of the present disclosure.

TABLE 4

Category reassignment in the secondary analysis

| Algorithm | Number of tests | Number (%) recategorized as predicted | Number (%) remaining in same category |
|---|---|---|---|
| Best 30 tiles | 11 | 7 (64%) | 4 (36%) |
| Best 30 tiles weighted | 18 | 13 (72%) | 5 (28%) |

TABLE 4-continued

Category reassignment in the secondary analysis

| Algorithm | Number of tests | Number (%) recategorized as predicted | Number (%) remaining in same category |
|---|---|---|---|
| Best 30 tiles segmented | 8 | 5 (63%) | 3 (37%) |
| Best 30 tiles segmented and weighted | 12 | 4 (33%) | 8 (67% |
| All tiles weighted | 3 | 3 (100%) | 0 |
| Total | 52 | 32 (62%) | 20 (38%) |

The number of tests differs between algorithms becomes some were less effective so fewer recordings met the 2 dB threshold rule (e.g. all weighted)

<Effect of Skin Tone>

SNR-F scores based on the mid-face region without tiling were lower for skin tones 5 and 6 than for paler tones (Error! Reference source not found.) and approximately twice as many signals were in observer category 2 (not suitable for analysis) and none were in category 0. Mean SNR-F scores for skin tone 5 improved from −7.03 to −0.41 to −5.59 following T&A, depending on the algorithm used, and from −8.24 to −5.44 to −6.68 for skin tone 6. In addition, using the 'best 30 tiles weighted' algorithm (which had the highest SNR-F score combined with appropriate waveform morphology in the analyses described above), 41% of signals for skin tones 5 and 6 improved from observer category 2 to 1, and 12% from category 1 to 0.

TABLE 2

Signal quality by Fitzpatrick skin tone

| Skin tone | Sample size | No tiling | B | BW | BS | BWS | AW |
|---|---|---|---|---|---|---|---|
| 1 | 972 | −2.63 ± 7.79 | −0.69 ± 7.55 | −0.06 ± 7.55 | −0.34 ± 7.08 | 0.35 ± 6.86 | −0.71 ± 8.19 |
| 2 | 1671 | −4.97 ± 6.69 | −3.17 ± 6.56 | −2.53 ± 6.67 | −2.74 ± 6.1 | −1.99 ± 6.03 | −3.48 ± 7.16 |
| 3 | 523 | −5.64 ± 6.51 | −3.4 ± 6.47 | −2.84 ± 6.53 | −3.11 ± 6.03 | −2.39 ± 5.87 | −3.89 ± 6.88 |
| 4 | 466 | −5.60 ± 7.05 | −3.96 ± 6.78 | −3.28 ± 6.77 | −3.39 ± 6.29 | −2.58 ± 6.2 | −3.78 ± 7.47 |
| 5 | 243 | −7.03 ± 5.67 | −5.25 ± 5.71 | −4.74 ± 5.64 | −4.90 ± 5.26 | −4.10 ± 5.09 | −5.59 ± 6.03 |
| 6 | 126 | −8.24 ± 4.75 | −6.45 ± 5.02 | −5.92 ± 4.91 | −6.25 ± 4.43 | −5.44 ± 4.27 | −6.68 ± 5.66 |

Value are mean ± SD SNR-F values in dB
B, best; S, segmented; W, weighted; algorithms are explained in Error! Reference source not found.

Dynamic region of interest selection using T&A according to embodiments of the disclosure overcomes many of the issues of a 'static' fixed region of interest, by identifying the highest quality signals for each individual subject. The T&A approach ignores areas of the face that are obscured (such as by glasses or facial hair, as in Figure SB of the present disclosure). The mid-face was divided into 62 tiles of 20×20 pixels. Initial exploratory studies indicated that the size of tile was not critical, although the largest and smallest tiles produced poor-quality signals, whilst the use of a large number of small tiles is computationally expensive. Algorithms based on the 'best 30 tiles' incorporated about half of the mid-face area but without being excessively computationally expensive.

These results demonstrate that T&A of embodiments of the present disclosure improves the signal quality compared with the entire mid-face, as evidenced by the improvements in observer-rated category and increased SNR-F scores. Importantly, this approach also improved the signal quality in individuals with darker skin tones (high-quality rPPG signals are typically more difficult to obtain from individuals with darker skin tones (e.g. Fitzpatrick skin types 5 and 6) because of light absorption by melanin). Specifically, T&A in accordance with embodiments of the disclosure improved signal quality in Fitzpatrick skin tones 5 and 6 in terms of SNR-F score and observer-defined quality categories.

To ensure that the improvement in SNR-F score represented a genuine improvement in signal quality, signals from the same videos were processed using the two different methods and assessed by an observer blinded to the prior signal processing (mid-face analysis vs T&A). Human observation is an accepted method for the task-based evaluation of medical images, and has been used to validate machine-based assessment of, for example, atrial fibrillation, prostate cancer histology and breast cancer diagnosis. Independent annotator assessment has also been used to validate the signal quality of PPG signals recorded by mobile phones. In our study, there was a good match between signal quality category determined by the observer and SNR-F scores. Importantly, as further verification, signals that we predicted would be improved by T&A based on SNR-F score were indeed assigned to a higher quality category by the observer although a few signals had lower quality. This may arise for various reasons, for example some tiles may contain high-quality signals for only part of the recording period (which is compensated for by the segmented approach to aggregation), or external noise may be interpreted as a pulse waveform if it has the right frequency (~1 Hz).

In summary, region of interest detection according to embodiments of the disclosure represents a paradigm shift in rPPG by focusing on the collection of small amounts of high-quality data that most faithfully represent pulse wave morphology in each individual, rather than capturing a large amount of low-quality data. Rather than use of a predefined specific area of the face, our method ensures that the best signal is used for each subject. This approach also improves the quality of the rPPG signals from individuals with darker skin tones.

<Method>

Hence, more generally, a method of performing a measurement of a physiological parameter of a person from a series of images is provided in accordance with embodiments of the disclosure. FIG. 12 illustrates an example method in accordance with embodiments of the disclosure. This method may be performed by an apparatus such as apparatus 3000 as described with reference to the present disclosure.

The method of FIG. 12 starts at step S1200 and proceeds to step S1202.

In step S1202, the method comprises acquiring a series of images of a person, each image of the series of images including at least a skin exposed region of the person. The method then proceeds to step S1204.

In step S1204, the method comprises partitioning at least a portion of each image of the series of images into a plurality of image regions. The method then proceeds to step S1206.

In step S1206, the method comprises computing target colour values for each image region of each image of the series of images. The method then proceeds to step S1208.

In step S1208, the method comprises determining a signal quality indicator of each of the plurality of image regions for the series of images from the target colour values. The method then proceeds to step S1210.

In step S1210, the method comprises classifying the plurality of image regions in accordance with the signal quality indicator which has been determined. The method then proceeds to step S1212.

In step S1212, the method comprises performing a measurement of a physiological parameter of the person using one or more of the plurality of image regions based on a result of the classification.

In the example of FIG. 12 of the present disclosure, the method then proceeds to and ends with step S1214.

Of course, it will be appreciated that the present disclosure is not particularly limited to the specific configuration of the method illustrated in FIG. 12 of the present disclosure (including, for example, the specific ordering of the steps of FIG. 12). For example, a number of the steps of the method may be performed in a different order than illustrated in FIG. 12. Alternatively or in addition, a number of the steps of FIG. 12 may be performed either in sequence or in parallel.

As an example, it will be appreciated that the computation of the colour values and the determination of the signal quality performed in steps S1206 and S1208 may be performed in parallel for different tiles or image regions. That is, once the colour values for a first tile have been computed (across the series of images) the signal quality of this first tile can be determined even as the colour values for a second, different, tile are being computed for the series of images. This further improves the speed and efficiency of the measurement of the physiological characteristics of the user.

In addition, embodiments of the present disclosure may be arranged in accordance with the following numbered clauses:

1) A method of performing a measurement of a physiological parameter of a person from a series of images, the method comprising:
   acquiring a series of images of a person, each image of the series of images including at least a skin exposed region of the person;
   partitioning at least a portion of each image of the series of images into a plurality of image regions;
   computing target colour values for each image region of each image of the series of images;
   determining a signal quality indicator of each of the plurality of image regions for the series of images from the target colour values;
   classifying the plurality of image regions in accordance with the signal quality indicator which has been determined; and
   performing a measurement of a physiological parameter of the person using one or more of the plurality of image regions based on a result of the classification.

2) The method according to clause 1, wherein the signal quality indicator is a signal to noise ratio.

3) The method according to clause 2, wherein determining the signal to noise ratio comprises, for each image region across the series of images, performing a discrete Fourier Transform on the target colour values of each image region, calculating the power spectral density of the image region, determining a fundamental power in fundamental harmonic frequency bands, and comparing the fundamental power in the fundamental harmonic frequency bands to power outside the fundamental harmonic frequency bands.

4) The method according to any preceding clause, wherein the image regions are regularly sized image regions.

5) The method according to any preceding clause, further comprising: analysing the image of the person to detect one or more features of interest in the image; and selecting the at least a portion of each image as at least a portion of the image comprising one or more features of interest.

6) The method according to clause 5, wherein the features of interest in the image include facial landmarks.

7) The method according to clause 6, wherein the facial landmarks include at least one of eyes, nose, mouth, cheeks, ears, forehead or chin of the person.

8) The method according to any preceding clause, wherein classifying the plurality of image regions in accordance with the signal quality indicator comprises generating a classification score for each image region.

9) The method according to clause 8, wherein the method comprises selecting the image regions with the N best classification scores and performing the measurement of the physiological parameter of the person on the selected image regions.

10) The method according to clause 8, wherein the method comprises selecting the image regions with the best M % of classification scores and performing the measurement of the physiological parameter of the person on the selected image regions.

11) The method according to clause 8, wherein the method comprises selecting image regions where the classification score satisfies a predetermined condition and performing the measurement of the physiological parameter of the person on the selected image regions.

12) The method according to clause 11, wherein the predetermined condition is a threshold value for the classification score.

13) The method according to clause 11, wherein the predetermined condition is that an image region is located within a certain distance from a predetermined region of the image.

14) The method according to clause 11, wherein the predetermined condition is a result of a similarity-based clustering algorithm.

15) The method according to clause 11, wherein the predetermined condition is that an image region forms part of a largest continuous block within the image.

16) The method according to clause 8, wherein the method comprises performing a weighted aggregation of the plurality of image regions in accordance with the classifications score for each image region and performing the measurement of the physiological parameter of the person using the weighted aggregation.

17) The method according to any preceding clause, wherein classifying the plurality of image regions in accordance with the signal quality indicator: generating a classification score for each image region; selecting a portion of the plurality of image regions in accordance with the classification score and generating a resultant signal for the selected portion of the plurality of image regions; and wherein the method further comprises performing the measurement of the physiological parameter of the person using the resultant signal.

18) The method according to any preceding clause, wherein the method comprises separating the images of the series of images into a number of time segments; and performing the method of the preceding clause for each time segment of the series of images.

19) The method according to clause 18, wherein the time segments form a plurality of overlapping time segments.

20) The method according to any preceding clause, wherein performing a measurement of the physiological parameter of the person comprises: performing a periodogram on at least one of a red, green and blue channel of the one or more of the plurality of image regions based on a result of the classification; and determining the physiological parameter based on the periodogram.

21) The method according to any preceding clause, wherein acquiring the series of images comprises optimizing one or more image capture settings of an image capture device for capture of the series of images of the person; and controlling the image capture device to capture the series of images of the person using the optimized image capture settings.

22) The method according to any preceding clause, wherein the method further comprises applying a time delay to one or more of the plurality of image regions with respect to the other image regions of the plurality of image regions before determining the signal quality indicator of each of the plurality of image regions for the series of images.

23) Computer software which, when executed by a computer, causes the computer to perform the method according to any preceding clause.

24) A non-transitory machine-readable storage medium which stores computer software according to clause 23.

25) An apparatus for performing a measurement of a physiological parameter of a person from a series of images, the apparatus comprising circuitry configured to:
acquire a series of images of a person, each image of the series of images including at least a skin exposed region of the person;
partition at least a portion of each image of the series of images into a plurality of image regions;
compute target colour values for each image region of each image of the series of images;
determine a signal quality indicator of each of the plurality of image regions for the series of images from the target colour values;
classify the plurality of image regions in accordance with the signal quality indicator which has been determined; and
perform a measurement of a physiological parameter of the person using one or more of the plurality of image regions based on a result of the classification.

26) A system comprising a portable electronic device and an apparatus according to clause 25, the portable electronic device comprising:
an image capture device configured to capture a series of images of a person, each image of the series of images including at least a skin exposed region of the person; and
communication circuitry configured to:
transmit the series of images of the person to the apparatus according to clause 25; and
receive a measurement of a physiological parameter of the person from the apparatus according to clause 25.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method of performing a measurement of a physiological parameter of a person from a series of images, the method comprising:
acquiring a series of images of a person, each image of the series of images including at least a skin exposed region of the person;
partitioning at least a portion of each image of the series of images into a plurality of image regions;
computing target colour values for each image region of each image of the series of images;
determining a signal quality indicator of each of the plurality of image regions for the series of images from the target colour values;
classifying the plurality of image regions in accordance with the signal quality indicator which has been determined; and
performing a measurement of a physiological parameter of the person using one or more of the plurality of image regions based on a result of the classification;
wherein classifying the plurality of image regions in accordance with the signal quality indicator comprises generating a classification score for each image region; and
wherein the method comprises performing a weighted aggregation of the plurality of image regions in accordance with the classifications score for each image region and performing the measurement of the physiological parameter of the person using the weighted aggregation.

2. The method according to claim 1, wherein the signal quality indicator is a signal to noise ratio.

3. The method according to claim 2, wherein determining the signal to noise ratio comprises, for each image region across the series of images, performing a discrete Fourier Transform on the target colour values of each image region, calculating the power spectral density of the image region, determining a fundamental power in fundamental harmonic frequency bands, and comparing the fundamental power in the fundamental harmonic frequency bands to power outside the fundamental harmonic frequency bands.

4. The method according to claim 1, wherein the image regions are regularly sized image regions.

5. The method according to claim 1, further comprising: analysing the image of the person to detect one or more features of interest in the image;
and selecting the at least a portion of each image as at least a portion of the image comprising one or more features of interest.

6. The method according to claim 5, wherein the features of interest in the image include facial landmarks.

7. The method according to claim 6, wherein the facial landmarks include at least one of eyes, nose, mouth, cheeks, ears, forehead or chin of the person.

8. The method according to claim 1, wherein the method comprises selecting the image regions with the N best classification scores and performing the measurement of the physiological parameter of the person on the selected image regions.

9. The method according to claim 1, wherein the method comprises selecting the image regions with the best M% of classification scores and performing the measurement of the physiological parameter of the person on the selected image regions.

10. The method according to claim 1, wherein the method comprises selecting image regions where the classification score satisfies a predetermined condition and performing the measurement of the physiological parameter of the person on the selected image regions.

11. The method according to claim 10, wherein the predetermined condition is a threshold value for the classification score.

12. The method according to claim 10, wherein the predetermined condition is that an image region is located within a certain distance from a predetermined region of the image.

13. The method according to claim 10, wherein the predetermined condition is a result of a similarity-based clustering algorithm.

14. The method according to claim 10, wherein the predetermined condition is that an image region forms part of a largest continuous block within the image.

15. The method according to claim 1, wherein classifying the plurality of image regions in accordance with the signal quality indicator comprises: generating a classification score for each image region; selecting a portion of the plurality of image regions in accordance with the classification score and generating a resultant signal for the selected portion of the plurality of image regions; and wherein the method further comprises performing the measurement of the physiological parameter of the person using the resultant signal.

16. The method according to claim 1, wherein the method comprises separating the images of the series of images into a number of time segments; and performing the method of claim 1 for each time segment of the series of images.

17. The method according to claim 16, wherein the time segments form a plurality of overlapping time segments.

18. The method according to claim 1, wherein performing a measurement of the physiological parameter of the person comprises: performing a periodogram on at least one of a red, green and blue channel of the one or more of the plurality of image regions based on a result of the classification; and determining the physiological parameter based on the periodogram.

19. The method according to claim 1, wherein acquiring the series of images comprises optimizing one or more image capture settings of an image capture device for capture of the series of images of the person; and controlling the image capture device to capture the series of images of the person using the optimized image capture settings.

20. The method according to claim 1, wherein the method further comprises applying a time delay to one or more of the plurality of image regions with respect to the other image regions of the plurality of image regions before determining the signal quality indicator of each of the plurality of image regions for the series of images.

21. A non-transitory machine-readable storage medium which stores computer software which, when executed by a computer, causes the computer to perform a method according to claim 1.

22. An apparatus for performing a measurement of a physiological parameter of a person from a series of images, the apparatus comprising circuitry configured to:
acquire a series of images of a person, each image of the series of images including at least a skin exposed region of the person;
partition at least a portion of each image of the series of images into a plurality of image regions;
compute target colour values for each image region of each image of the series of images;
determine a signal quality indicator of each of the plurality of image regions for the series of images from the target colour values;
classify the plurality of image regions in accordance with the signal quality indicator which has been determined; and
perform a measurement of a physiological parameter of the person using one or more of the plurality of image regions based on a result of the classification;
wherein classifying the plurality of image regions in accordance with the signal quality indicator comprises generating a classification score for each image region; and
the circuitry is configured to perform a weighted aggregation of the plurality of image regions in accordance with the classifications score for each image region and performing the measurement of the physiological parameter of the person using the weighted aggregation.

23. A system comprising a portable electronic device and an apparatus according to claim 22, the portable electronic device comprising:
an image capture device configured to capture a series of images of a person, each image of the series of images including at least a skin exposed region of the person; and
communication circuitry configured to:
transmit the series of images of the person to the apparatus according to claim 22; and
receive a measurement of a physiological parameter of the person from the apparatus according to claim 22.

* * * * *